United States Patent Office 3,763,107

Patented Oct. 2, 1973

3,763,107
POLYBENZIMIDAZOLES AND METHOD OF PREPARATION

Gaetano Francis D'Alelio, 2011 E. Cedar St., South Bend, Ind. 46617

No Drawing. Filed Nov. 10, 1970, Ser. No. 88,475
Int. Cl. C08g 9/06
U.S. Cl. 260—72.5 26 Claims

ABSTRACT OF THE DISCLOSURE

This invention deals with a novel, relatively simple process of preparing polybenzimidazoles, containing the repeating units of the structure

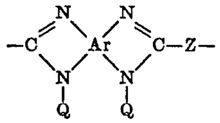

which comprises condensing tetraamino compounds,

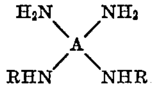

in solution, with dialdehydes, $Z(CHO)_2$, while oxygen or other oxygen-containing gases are passed through the solution, wherein Ar represents a tetravalent aromatic moiety in which $—NH_2$ and —NHR are disposed ortho to each other,
Z represents a divalent organic moiety as the residue of a dialdehyde, $Z(CHO)_2$,
Q represents R and $—H_2CZCH_2—$, and in which
R represents hydrogen and a monovalent hydrocarbon moiety containing one to twelve carbon atoms.

New types of polybenzimidazoles, including crosslinkable, crosslinked, telomerized polymers and copolymers, as well as the known polybenzimidazoles, have been prepared by this new process.

PRIOR ART

The closest references to the instant application are the following:

(1) The synthesis of imidazole polymers has been reported in U.S. Pat. 3,174,947 (1965); J. Polymer Science, 50, 511 (1961); by melt polymerizations at high temperatures of tetraamino-aryl compounds with dicarboxylic acid aryl esters;

(2) Androva et al., Vysokomolekul Soedin, 6 (8), 1493–5 (1964) have reacted 3,3'-diaminobenzidine and aromatic dicarbonyl compound as melts at 250–270° C. to obtain polymers described as polybenzimidazolines;

(3) U.S. Pat. 3,493,541, Feb. 3, 1970 describes the reaction of aromatic dialdehydes and aromatic tetraamines in solution heated rapidly to produce polybenzimidazolines, which are insoluble in dimethylacetamide and concentrated sulfuric acid;

(4) The Journal of Polymer Science, Vol. 8 (A1), No. 1, 171 (1970) shows the condensation in solvents of diaminobenzidine with isophthaldehyde-bis-(disulfite adduct) to polymers which precipitate from the solvent.

SUMMARY OF THE INVENTION

This invention is concerned generally with the class of polymers known as polybenzimidazoles which have the repeating unit,

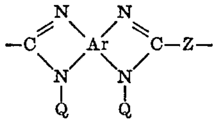

wherein

Ar represents a tetravalent aromatic moiety in which the

=N— and 

groups are disposed ortho to each other,
Z represents the divalent organic moiety as the residue of an aldehyde, $Z(CHO)_2$, and
Q represents a member selected from the class consisting of H, a monovalent hydrocarbon moiety, R, containing one to twelve carbon atoms, and $$—H_2C—Z—CH_2—$$

Specifically, this invention deals with a novel, relatively simple process for preparing the polybenzimidazoles; this process is also particularly suited for the preparation of new types of polybenzimidazoles which are difficult or impossible to prepare by currently known processes. For example, heretofore, polymers in which Q is $—H_2C—Z—CH_2—$ do not appear to be known.

Currently, the polybenzimidazoles are prepared by reacting an aromatic tetraamino compound with an aryldicarboxylic diphenyl ester at high temperatures as melt polymerizations, as illustrated by Equation 1,

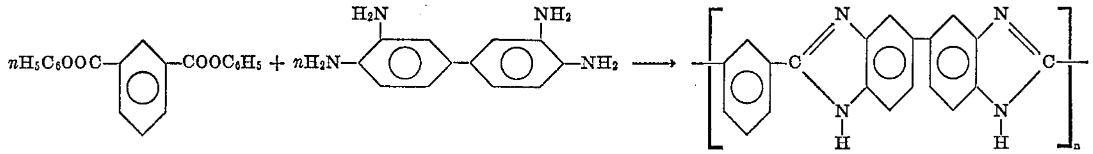

(Eq. 1)

The phenyl esters are used since only low molecular weight products are obtained when the esters of aliphatic alcohols, such as the dimethyl esters, are employed in the synthesis.

The process of Equation 1 is complicated, involving high temperatures, which necessitates interrupting the reaction to grind an initial, solid low molecular weight polycondensation product to a homogeneous powder and to reheat it in the solid state at high temperatures, for example, at 400° C. at very low pressures of the order of 0.1 mm. Hg or less, for extended periods of time to obtain practical molecular weights. Furthermore, the polymers prepared by these melt polymerizations usually are either insoluble, or slightly or difficultly soluble in such solvents as dimethylacetamide, dimethylformamide, dimethylsulfoxide, butyrolactone and the like, which are commonly used for the fabrication of high performance polymers, but these melt polymerization products can, in some cases, be dissolved in concentrated sulfuric acid and chlorosulfonic acid, which severely restrict the practical applications of the polymers.

In some other cases, when these melt polymers are prepared under critical conditions, they can be dissolved in solutions of dimethylacetamide or dimethylformamide containing 2 to 10% by weight of lithium chloride under pressure at temperature above the normal boiling point of the solvents. Films cast from such solutions must be treated, usually with water, to extract the lithium chloride, thereby leaving imperfections as pores in the film. Also, residual quantities of lithium chloride are left in the film adversely effecting their electrical properties. When fibers are spun from such solutions, into a precipitation bath, whether the medium in the bath is a solvent or non-solvent for lithium chloride, the quality and physical properties of the fiber is low, due to imperfections resulting from the original presence of lithium chloride or to the retention of residual amounts of this salt.

The high temperatures required to produce the polymers by Equation 1, preclude its use for the preparation of substituted polybenzimidazoles containing other secondary polymerizable groups, such as $CH_2=CH—$, $CH_2=CHCH_2—$, etc. attached either to the diphenyl ester, as in $CH_2=CHC_6H_3(COOC_6H_5)_2$ or to the tetraamino reactant as in 3,3′-di[allylamino]-benzidine,

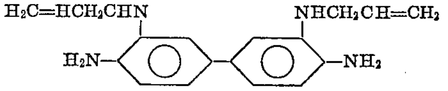

One object of this invention is to establish a new synthesis of polybenzimidazoles; another object of this invention is to synthesize polybenzimidazoles or their precursors which are soluble in practical solvents which will allow the fabrication of films, fibers, and laminated products. Still another objective is to prepare the polybenzimidazoles initially in a practical solvent from which they can be used directly. Another object of this invention is to prepare new polybenzimidazoles. Other objectives of this invention will become apparent as a description of the invention proceeds.

I have discovered that the objectives of this invention can be realized and that the polybenzimidazoles can be synthesized readily in solution by the reaction of a dialdehyde, $Z(CHO)_2$, with a tetraamino aromatic compound,

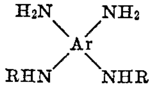

in which the $NH_2$ and NHR groups are ortho-disposed to each other, by adding the aldehyde to the amine solution while simultaneously passing oxygen or oxygen-containing gases through the solution. The symbols Ar, Z and R are more fully described hereinafter.

The overall reaction may be written as

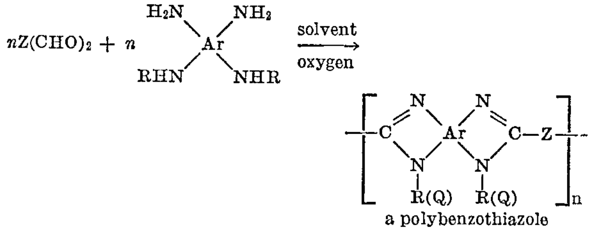

a polybenzothiazole (Eq. 2)

Unexpectedly, the condensation polymerization of Equation 2 was found to be facile as evidenced by a rapid increase in the viscosity of the reaction mixture when performed even at room temperature in appropriate solvents.

Any aromatic-type tetraamino compound having two pairs of $NH_2$ and NHR groups, in which $NH_2$ and NHR are ortho-disposed to each other, are suitable for the preparation of the compounds of this invention for reaction with dialdehydes; the only requirement of the tetraamino compounds used in the practice of this invention is that the pair of $NH_2$ and NHR amino groups be attached directly to an aromatic ring. Thus, Ar in the formulas given in Equation 2 can be the tetravalent nucleus derived from benzene, toluene, xylene, naphthalene, pyridine, quinoline, quinoxaline as well as a multiplicity of such aromatic nuclei linked directly to each other or separated by O, S, CO, $SO_2$,$CH_2$, NR, e.g., NH, $NCH_3$, $NC_6H_5$, etc.; —CH=CH—, —Si—, etc., linkages or by ester linkages such as —COO— or by imide or amide linkages such as >CON— and —CONH— etc., in which cases the $NH_2$ and NHR groups are attached to the six-membered rings, such as, for example, to the structures:

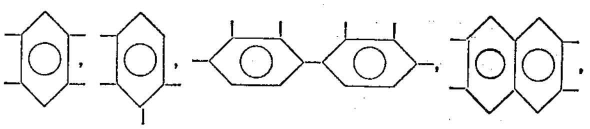

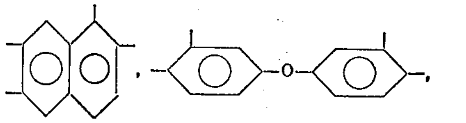

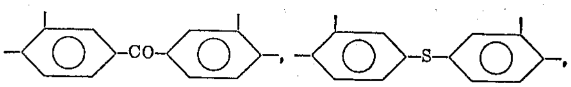

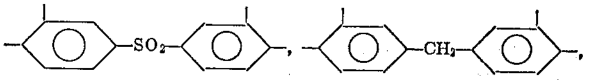

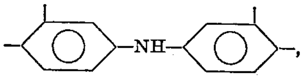

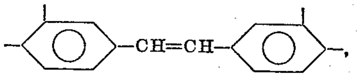

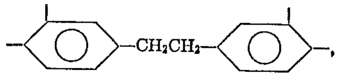

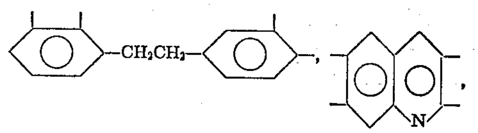

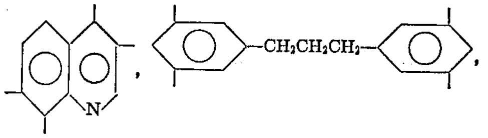

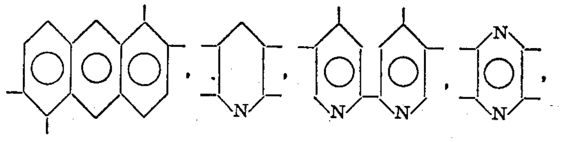

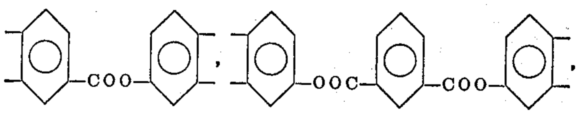

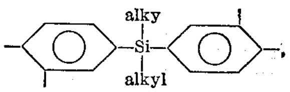

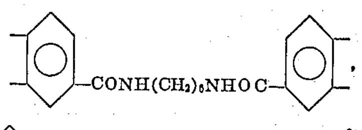

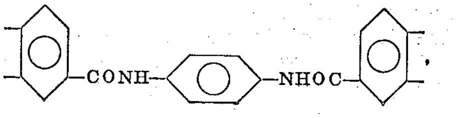

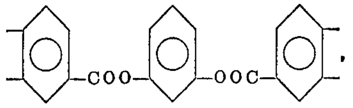

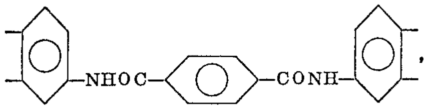

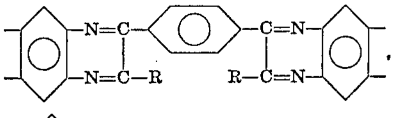

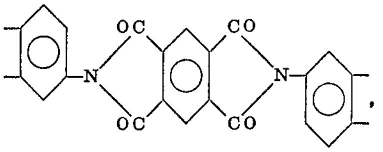

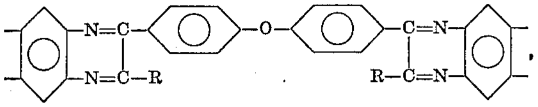

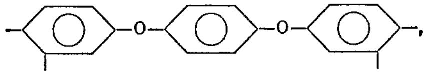

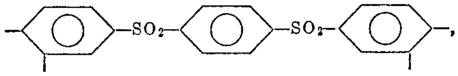

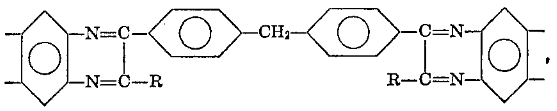

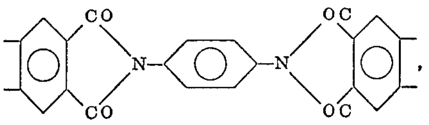

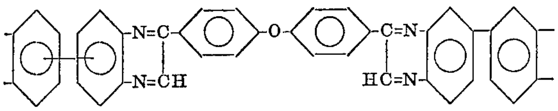

etc.

The substituents not occupied in the Ar structures by $NH_2$ and NHR are occupied by hydrogen or any of the substituents which normally are found on aromatic-type structures such as hydrocarbon, halogen, nitrile, nitro, alkoxy, aryloxy, etc., but hydrogen and halogen are preferred.

A few typical examples of tetraamino compounds having the Ar structure shown above are

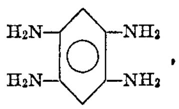

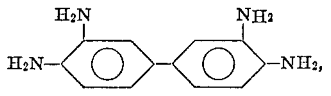

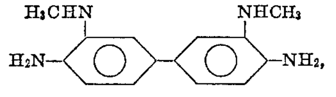

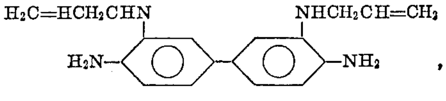

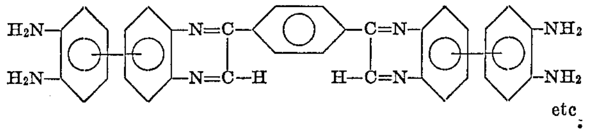

etc.

In the foregoing formula,

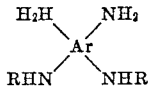

R is selected from the class of hydrogen and hydrocarbon containing one to twelve carbon atoms; R may be aliphatic, cycloaliphatic, olefinic, aromatic, carbocyclic or heterocyclic, as exemplified by $—CH_3$, $—C_2H_5$, $—C_3H_7$, $—CH=CH_2$, $—CH_2CH=CH_2$, $—CH_2CH=CHCH_3$, $—C_8H_{17}$, $—CH=CHCH_3$, $—CH=CHC_6H_5$, $—C_6H_5$, $—C_6H_4—C_6H_5$, $—C_6H_4OC_6H_5$, $—C_6H_{11}$, $C_6H_5N$, $—CH=CH—CH=CH_2$, $—CH=CH—CH=CHCH_3$, $—C_{10}H_8$, etc.

Also, the formula

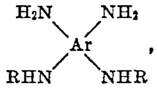

represents a oligomeric aromatic-type tetraamines,

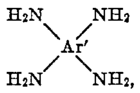

such as are prepared by condensing $(n'+1)$ moles of

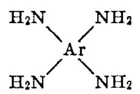

with $n'$ moles of arylene-type diglyoxal, $Z(COCHO)_2$, in which $n'$ has a value of one to ten, having the repeating unit thus,

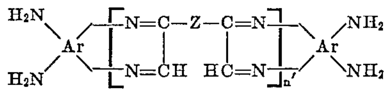

Other oligomeric structures containing amide, imide or ester links can be used in place of the quinoxaline units illustrated in the bracket.

In the dialdehydes used in the practice of this invention, Z is any divalent organic moiety to which is attached two formyl groups and represents the organic residue of the dialdehyde, $Z(CHO)_2$, and which can be aliphatic, cycloaliphatic, aromatic, carbocyclic, heterocyclic, ethylenic, acetylenic or mixtures of such groups and include the divalent moieties Ar'' which are equivalent to Ar except that two of the four valences in Ar are occupied by H and R. Some representative Z groups are:

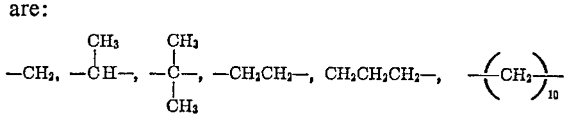

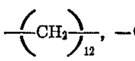, $—CH=CH—$, $—H_2C—CH=CH—CH_2—$, $—C\equiv C—$, $—H_2CC\equiv CCH_2—$, $—CHCl—Cl—$,

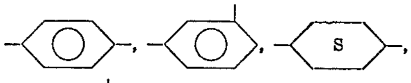

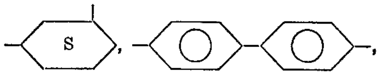

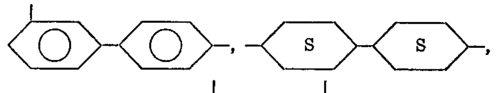

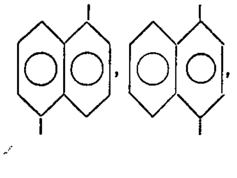

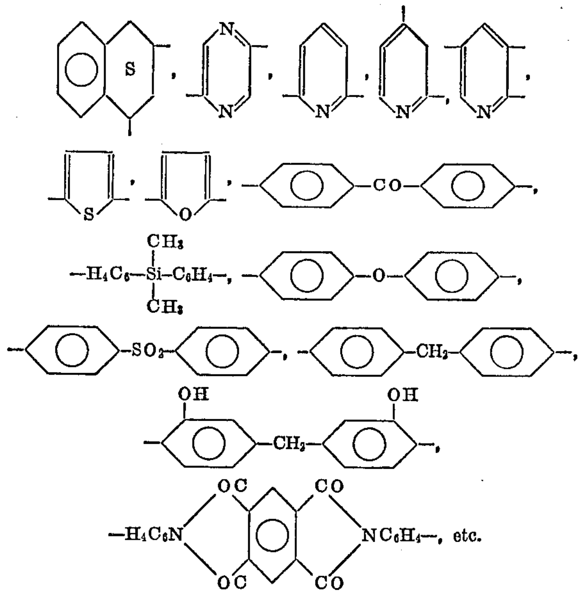

etc.

among which, the aromatic-type are preferred when thermally stable polymers are desired. Some specific examples of the aromatic-type dialdehydes are:

terephthaldehyde,
isophthaldehyde,
bibenzyl-4,4'-dicarboxaldehyde,
bibenzyl-3,3'-dicarboxaldehyde,
bibenzyl-3,4'-dicarboxaldehyde,
biphenyl-4,4'-dicarboxaldehyde,
biphenyl-3,3'-dicarboxaldehyde,
biphenyl-2,2'-dicarboxaldehyde,
biphenyl-2,3'-dicarboxaldehyde,
biphenyl-2,4'-dicarboxaldehyde,
biphenyl-3,4'-dicarboxaldehyde,
naphthalene-1,4-dicarboxaldehyde,
naphthalene,1,5-dicarboxaldehyde,
naphthalene-1,8-dicarboxaldehyde,
naphthalene-2,6-dicarboxaldehyde,
naphthalene-1,7-dicarboxaldehyde,
naphthalene-2,7-dicarboxaldehyde,
diphenylether-4,4'-dicarboxaldehyde,
diphenylsulfide-4,4'-dicarboxaldehyde,
diphenylsulfone-4,4'-dicarboxaldehyde,
diphenylether-3,3'-dicarboxaldehyde,
diphenylsulfide-3,3'-dicarboxaldehyde,
diphenylsulfone-3,3'-dicarboxaldehyde,
diphenylmethane-4,4'-dicarboxaldehyde,
diphenylmethane-3,3'-dicarboxaldehyde,
benzophenone-4,4'-dicarboxaldehyde,
benzophenone-3,3'-dicarboxaldehyde,
benzophenone-3,4'-dicarboxaldehyde,
2,2'-bis(4-carboxaldehydrophenyl)propane,

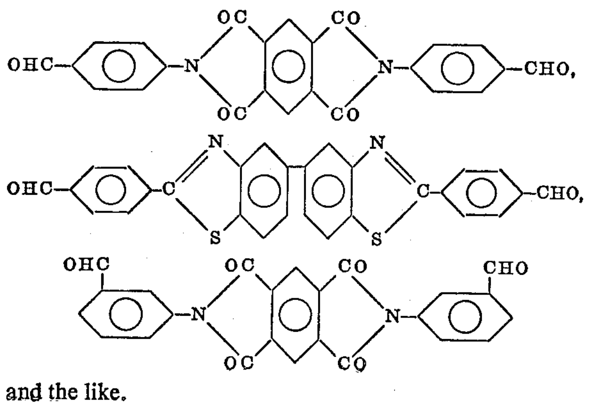

and the like.

The dialdehyde may be added to the reaction mixture either as an undiluted liquid or as solid or in solution in the same solvents used for tetraamine or in a different solvent in which both the tetraamine and polymer are soluble.

Instead of the aldehydes, their acetal and Schiff base derivatives, $Z[CH(OR')_2]_2$ and $Z[CH{=}NR']_2$, capable of generating aldehydes, may be used in the practice of this invention. For example, instead of terephthaldehyde, the methyl, ethyl or butyl tetraacetals, $$(R'O)_2HCC_6H_4CH(OR')_2$$

may be used, in which case alcohol is eliminated instead of water, in the course of the reaction; for this reason, the acetals of alcohols of low boiling point are preferred, although those of higher boiling points are also useful. Similarly, $(CH_3O)_2HCCH{=}CHCH(OCH_3)_2$ and $$(CH_3O)_2CH{-}C{\equiv}C{-}CH(OCH_3)_2$$

may be used instead of their corresponding aldehydes. Likewise, the Schiff bases, $Z(CH{=}NR')_2$ for example, p-xylylidenemethylamine, $p\text{-}C_6H_4(CH{=}NCH_3)_2$ may be used instead of terephthaldehyde, in which case, methylamine, instead of water, is eliminated during the course of the reaction. For this reason, the Schiff bases of amine of low boiling point are preferred, although those of higher boiling points are also effective. R' in the above formula correspond to the hydrocarbons containing one to twelve carbon atoms previously described for R.

The polymerization reaction of Equation 2 is performed in appropriate solvents over a wide range of temperatures from about 0° C. to the boiling point of the particular solvent or mixtures of solvents, a suitable range being from 10 to 150° C., and preferably from about 100 to 125° C. A particularly useful class of solvents are the normally liquid N,N-dialkylcarboxylamides of which the lower molecular weight species are preferred, for example, N,N-dimethylformamide and N,N-dimethylacetamide. Other solvents which may be used in the present invention are: N,N-diethylformamide, N,N-dimethylmethoxyacetamide, N-methylcaprolactam, N,N-diethylacetamide, dimethyl sulfoxide, N - methyl - 2 - pyrrolidone, tetramethylurea, pyridine, dimethyl sulfone, hexamethylphosphoramide, tetramethylene sulfone, formamide, N-methylformamide, butyrolactone, N,N,N',N'-tetramethyl-alpha-ethylmalonamide, N,N,N',N' - tetramethylglutaramide, N,N,N',N' - tetramethylsuccinamide, thiobis - (N,N - dimethylacetamide), bis(N,N-dimethylcarbamylmethyl)ether, N,N,N',N' - tetramethylfumaramide, methylsuccinonitrile, 1,2,3 - tricyanopropane, alpha-ethylsuccinonitrile, succinonitrile, N,N-dimethylcyanoacetamide, N,N-dimethyl-beta-cyano-propionamide, dimethylester of methane disulfonic acid, diethylester of ethane-1,2-disulfonic acid, bis-(cyanomethyl)-sulfone, 1,2-dithiocyanopropane, bis - (thiocyanomethyl) ether, beta-thiocyanoisobutyronitrile, 5 - hydroxy-2-piperidone, 3-hydroxy-2-pyrrolidone, N-formyl-piperidine, N-formylpyrrolidone, 2,2',2,2'-tetraamino-5,5'-dimethyl-diphenylmethane, nitronaphthol, dimethylsulfoxide, N,N-dimethylaniline, N,N-diethylaniline, tetramethylenesulfoxide, pentamethylene sulfone, N,N - bis - (cyanomethyl)formamide, N,N' - diformyl-piperazine, N,N - dimethylcyanamide, glycolonitrile, hydracrylonitrile, malonitrile and N-acetal-2-pyrrolidone. The solvents can be used alone, in combinations of solvents, or in combination with poorer solvents such as ketones such as methyl ethyl ketone, nitroalkanes such as nitroethane, nitropropane, etc., or non-solvents such as minor amounts of benzene, benzonitrile, dioxane, xylene, toluene and cyclohexane.

The reaction of Equation 2 is a generalized reaction by which organic soluble polymers are obtained which, in their final form, may be either crosslinked or non-crosslinked. For example, when the dialdehyde, $Z(CHO)_2$, is condensed with a bis-N-substituted tetraamine,

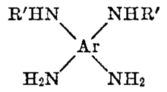

in which R′ is a hydrocarbon, for example, with

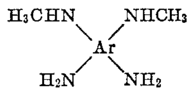

an uncrosslinked polymer is obtained, but when the tetraamine is

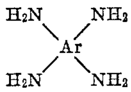

or

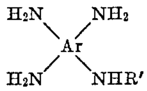

the final product may be uncrosslinked or crosslinked depending on the parameters under which it was prepared. Initially, in the course of the studies on these reactions, the mechanism by which crosslinking occurred was not understood however, through studies on the prototype reaction of non-polymerizing model compounds and systems, a mechanism for the reactions of the systems in this invention has been established.

In these prototype studies, o-phenylenediamine was used as the prototype for

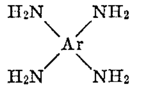

and N-methyl-(or N-phenyl)-ortho-phenylenediamines,

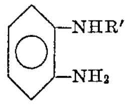

as the prototype for

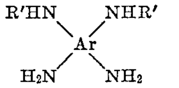

Benzaldehyde, as well as terephthaldehyde, was used as the prototype or model of the dialdehydes, $Z(CHO)_2$.

The mechanism for the imidazole formation was found to be a multistep reaction involving the formation of a Schiff base, and a ring closure involving oxidation by $O_2$ in which oxygen appears to catalyze the ring closure, in which the probable unstable intermediate is an imidazoline. Essential differences were found in the behavior of

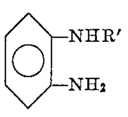

and

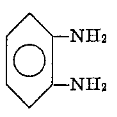

in their reactions with the aldehydes.

The reactions of

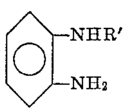

with aldehydes were relatively uncomplicated compared to those of

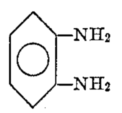

and are written as:

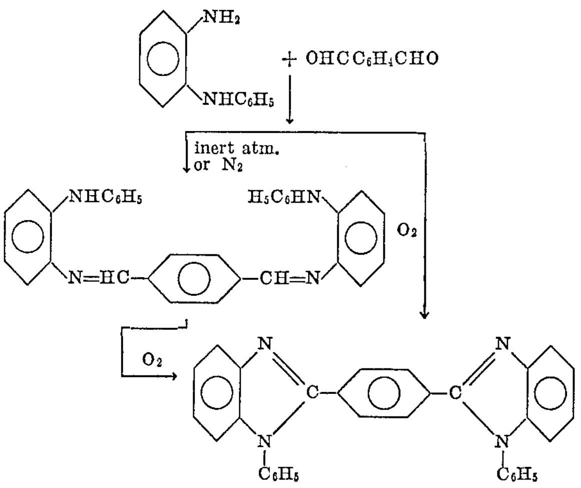

(Eq. 3)

These reactions are shown in the following prototype systems, A, B, and C.

(A) Preparation of 2,2′-p-phenylene-bis - 1 - phenylbenzimidazole.—Into a 100-ml., three-neck, round-bottom flask equipped with a Dean-Stark trap and a reflux condenser, stirrer, heating mantle, etc., are placed N-phenyl-o-phenylenediamine (3.56 g., 19.4 mmoles), terephthaldehyde (1.30 g., 9.7 mmoles) and 40 ml. dry benzene. The reaction mixture is heated to reflux as air is passed through the mixture until 0.31 ml. of water is collected in the Dean-Stark trap. Evaporation of the solvent yields a light-brown oil which solidifies on standing. The product is recrystallized twice from chloroform to yield pure 2,2′ - p - phenylene-bis - 1 - phenylbenzimidazole, M.P. 304° C.: IR (KBr disc) 3050 cm.$^{-1}$ (aromatic CH), 1600 cm.$^{-1}$ (C=N), no adsorption in 3350 cm.$^{-1}$ region (NH); NMR (DMSO-$d_6$/TMS) 7.90–6.40$\delta$ (m.).

*Analysis*.—Calc'd for $C_{32}H_{22}N_4$ (percent): C, 83.09; H, 4.79; N, 12.11. Found (percent): C, 83.20; H, 4.96; N, 11.84.

(B) Preparation of N,N′-p-xylylidene-bis-N″-phenyl-o-phenylenediamine.—Into a 100-ml., three-neck, round-bottom flask equipped with a reflux condenser are placed N-phenyl - o - phenylenediamine (1.78 g., 4.8 mmoles), terephthaldehyde (0.65 g., 4.8 mmoles), and 30 ml. dry benzene. The reaction mixture is purged with deoxygenated nitrogen, sealed under a positive nitrogen pressure, and heated to reflux for four hours. The reaction solvent is removed by vacuum distillation, yielding a red oil which solidifies on standing. The product is washed with 95% ethanol, yielding N,N′ - p - xylylidene - bis-N″-phenyl - o - phenylenediamine, 2.15 g. (95%), differential thermal analysis (10° C./min., $N_2$), 135° C. (endotherm), 250° C. (broad endotherm); visually, the sample lightened at 130° C., darkened at 220–280° C., melted at 280° C. to yield 2,2′ - p - phenylene - bis - 1-phenylbenzimidazole, M.P. 304° C.; IR (KBr disc), 3350 cm.$^{-1}$ (NH), 1585 cm.$^{-1}$ (C=).

(C) Cyclization of N,N′ - p - xylylidene - bis - N″-phenyl - o - phenylenediamine.—In a suitable apparatus, a solution of 2 g. of N,N′-p-xylylidene-bis-N″-phenyl-o-phenylenediamine in 25 ml. of DMAC is heated at reflux temperature while air is passed through the solution for six hours. The solution is precipitated in 100 ml. of water and the solid isolated and dried in vacuo; then recrystallized from chloroform, yielding 2,2′ - p - phenylene - bis - 1 - phenylbenzimidazole, M.P. 304° C., characterized by mixed melting point technique with authentic sample from A above and by its infrared spectrum.

Similar mechanisms have been established for the reaction of $C_6H_5CHO$ with

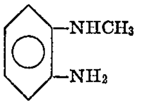

and

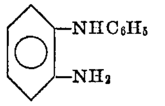

respectively, to give 1-methyl - 2 - phenylbenzimidazole, M.P. 96° C.: IR (KBr disc), 3025 cm.$^{-1}$ (aromatic CH), 2860, 1450 and 1370 cm.$^{-1}$ ($-CH_3$), and 1600 cm.$^{-1}$ (C=N) and 1,2 - diphenylbenzimidazole, M.P. 108–109° C.; (KBr disc), 3060 cm.$^{-1}$ (aromatic CH), 1610 cm.$^{-1}$ (C=N), respectively. All attempts to isolate and identify the imidazolines in the above reactions, which are possible cyclic intermediates on ring closure, were not successful.

Thus, when the tetraamino compounds contain two substituted amino groups, as is the case when R is not hydrogen but a monovalent hydrocarbon, R′, such as methyl, ethyl, vinyl, allyl, etc., for example,

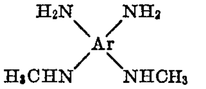

the reaction with the dialdehyde yields an intermediate poly-Schiff base which cyclizes to a polybenzimidazole which is free of crosslinks between chains, thus:

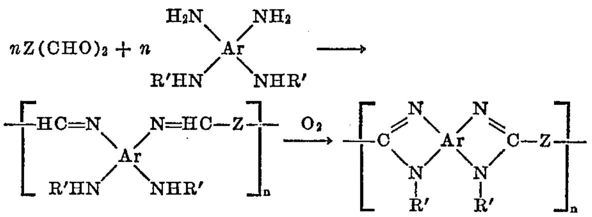

(Eq. 4)

The related prototype diamine,

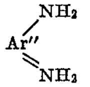

under appropriate conditions, can undergo the same type of Schiff base-oxidative ring closure as

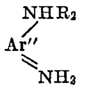

thus,

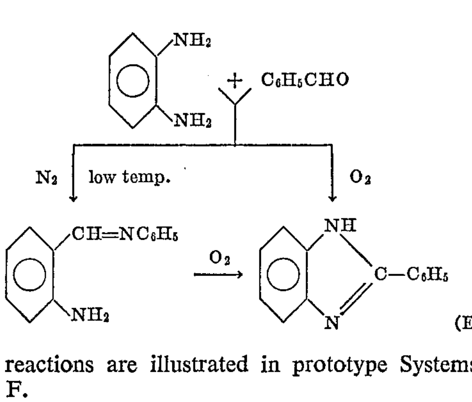

(Eq. 5)

These reactions are illustrated in prototype Systems D, E and F.

(D) Preparation of N - benzylidene - o - phenylenediamine.—In a suitable flask, a slurry of 3.50 g. (32.4 mmoles) of o-phenylenediamine in 15 ml. 95% ethanol is cooled to −15° C. while nitrogen is passed through the slurry. Then benzaldehyde (3.30 ml., 32.4 mmoles) in 10 ml. 95% ethanol is cooled to −15° C. and added dropwise to the amine slurry over the course of thirty minutes, yielding a homogeneous solution which, after about fifteen minutes at −15° C., precipitates a yellow solid which is collected by filtration and recrystallized from petroleum ether; yield of N-benzylidene-o-phenylenediamine, M.P. 60–61° C.; IR (KBr disc) 3450, 3375 cm.$^{-1}$ ($NH_2$), 1600 cm.$^{-1}$ (C=N); NMR ($CDCl_3$/TMS), 8.43δ (1H, S), 8.0–6.5δ (9H, m.), 4.1δ (2H, broad singlet).

(E) Preparation of 2-phenylbenzimidazole.—In a suitable reaction flask equipped with a condenser, etc., a solution of 1.7 g. (8.1 mmoles) of N - benzylidene-o-phenylenediamine in 15 ml. benzene is heated at reflux while air is passed through the solution for five hours, after which the 10 ml. of benzene are evaporated, and the solid removed by filtration and dried, yielding 2-phenylbenzimidazole, M.P. 290° C.

(F) Preparation of 2-phenylbenzimidazole.—In a suitable reactor, 3.5 g. of o-phenylenediamine is dissolved in 15 ml. of dimethylacetamide (DMAC) and heated to 90° C.; 3.3 ml. of benzaldehyde in 15 ml. of DMAC is added slowly dropwise over a period of thirty minutes while air is passed through the solution. Evaporation of the solvents leaves a residue which is identified as 2-phenylbenzimidazole, M.P. 288–290° C.

However, in the presence of unreacted benzaldehyde as when, one mole of o-phenylenediamine and one mole of benzaldehyde are mixed together initially, or when an excess of benzaldehyde is used, or when the diamine is added to the aldehyde, an unstable di-Schiff base is formed, which rearranges and cyclizes, without the necessity of an oxidation step, to yield 1-benzyl-1-phenyl benzimidazole, thus:

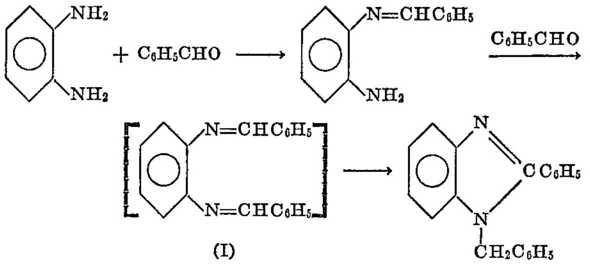

(I)

(Eq. 6)

However, if the aldehyde is added slowly in the presence of oxygen so that oxidative cyclization of the mono-Schiff base (I) occurs to eliminate the unreacted $-NH_2$ group before substantial additional quantities of aldehyde is added, the generation of 1-benzyl-2-phenyl benzimidazole can be reduced to minor or negligible quantities. These reactions are illustrated in prototype Systems G, H and I.

(G) The general procedure of protoype System D is repeated except that the benzaldehyde is added all at once and there is isolated a 60% yield of N-benzylidene-o-phenylenediamine and a 40% yield of 1-benzyl-2-phenylbenzimidazole, M.P. 132° C., IR (KBr disc) 3025 cm.$^{-1}$ (aromatic CH), 2950 cm.$^{-1}$ (aliphatic CH), 1620 cm.$^{-1}$ (C=N); NMR ($CDCl_3$/TMS), 8–6.9δ (14H, m.) and 5.4δ (2H, s.).

(H) The general procedure of prototype System D is repeated except that 6.6 ml. (64.8 mmoles) of benzaldehyde is used to establish a ratio of two moles of benzaldehyde to one mole of o-phenylenediamine and at the end of six hours of reaction time, only 1-benzyl-2-phenylbenzimidazole is isolated.

(I) To 1.96 g. of N-benzylidene-o-phenylenediamine in 20 ml. of toluene is added 1.08 g. of benzaldehyde and the mixture refluxed for three hours under nitrogen followed by distillation under reduced pressure to remove formed water and the toluene, and there is obtained only 1-benzyl-2-phenylbenzimidazole.

Similar mechanisms are operative when dialdehydes, $Z(CHO)_2$, for example $OHCC_6H_4CHO$, are reacted with $Ar''(NH_2)_2$, for example

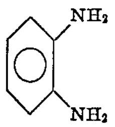

so that under the conditions specified above the main products of the reaction are substantially:

(1)

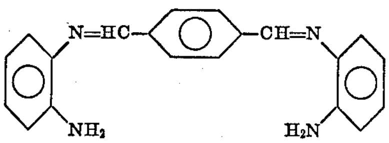

when one mole of the dialdehyde is added slowly to the two moles of diamine in solution in a nitrogen atmosphere; this di-Schiff base is converted to the bis-imidazole when subjected to oxidative cyclization.

(2)

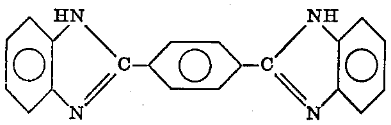

when one mole of dialdehyde is added slowly to two moles of diamine solution while air is passed through the solution.

(3) Polymer when one mole of dialdehyde is added rapidly to one mole of diamine in solution either in a nitrogen or an oxygen atmosphere. A typical polymer softens at 285–290° C. without melting, is soluble in concentrated sulfuric acid, and its IR spectrum, KBr disc, shows the presence of $CH_2$ at 2925 and 1460 cm.$^{-1}$, and NMR (10% DMSO-$d_6$/TMS) 5.7δ ($CH_2$). The polymer contains high concentrations of the structure

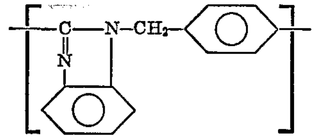

which arise by rearrangement of the bis-Schiff base

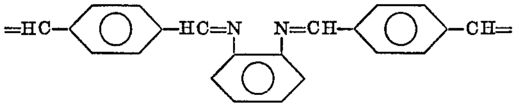

in a manner similar to the rearrangement of

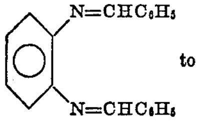

to

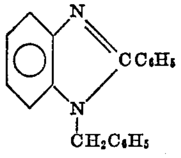

Also, the tetraamino compounds,

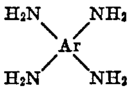

for example 3,3'-diaminobenzidine react with the monoaldehyde, $C_6H_5CHO$ by similar mechanisms to obtain (1) N,N'-dibenzylidine-3,3'-diaminobenzidine, M.P. 165–166° C.; IR (KBr disc) 3480 and 3420 cm.$^{-1}$ ($NH_2$); 1600 cm.$^{-1}$ (C=N); NMR (10% $CDCl_3$/TMS), 8.58δ (1H, d, Δδ=2 Hz.), 8.0–6.7δ (8H, m.) and 4.01δ (2H, broad singlet). *Analysis.*—Calc'd for $C_{26}H_{22}N_4$ (percent): C, 79.97; H, 5.68; N, 14.35. Found (percent): C, 79.93; H, 5.85; N, 14.22 which by oxidative ring closure is converted to 2,2'-diphenyl-5,5'-bibenzimidazole, M.P. 350° C. (DTA, 15° C./min.); IR (KBr disc), 3320–2800 cm.$^{-1}$ (imidazole NH, hydrogen bonded) and 1610 cm.$^{-1}$ (C=N), (2) 2,2'-diphenyl-5,5'-bibenzimidazole, and (3) 1,1'-dibenzyl-2,2'-diphenyl-5,5'-bibenzimidazole, M.P. 106° C., IR (KBr disc) 3050 cm.$^{-1}$ (aromatic CH), 2975 cm.$^{-1}$ (aliphatic CH) and 1605 cm.$^{-1}$ (C=N); NMR(15% $CDCl_3$/TMS), 8.0–6.9δ (13H, m.) and 5.33δ (2H, s.). *Analysis.*—Calc'd for $C_{40}H_{30}N_4$ (percent): C, 84.78; H, 5.34; N, 9.89. Found (percent): C, 84.24; H, 5.48; N, 10.04.

However, in the case of the reaction of

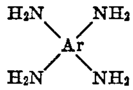

with $C_6H_5CHO$ even if the aldehyde is added slowly while air is being passed through the solution, some 1-benzyl substitution, as identified by IR and NMR measurements has been found to occur as a side reaction, which can amount to a few percent under favorable conditions when equal molar ratios are used, or, to the major product when an excess of aldehyde is used. On the basis of prototype studies, a similar behavior is to be expected when the tetraamino compounds are reacted with the dialdehydes, yielding branched or cross-linked structures.

An extension of the prototype studies shows that the tetraamino compounds,

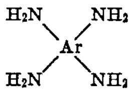

react with the dialdehydes, $Z(CHO)_2$, by mechanisms similar to those of the prototype system, but, also, because of the high functionality of the systems and the potentials of propagation to polymer, the polymerization systems are much more critical than the non-polymerizing prototype systems, since crosslinking at an early stage of reaction causes the polymer to precipitate as "brick-dusts" from the solution, yielding products of very little or no utility.

In the

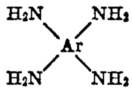

$:Z(CHO)_2$ polymerization systems, precipitation from solution and crosslinking is found to be most prevalent in those systems in which aldehyde functions are available for reaction with the amine group of an amino-Schiff base, as for example, in those syntheses in which the reactants are intimately mixed initially or in which excess dialdehyde is present. In contrast, precipitation and crosslinking is minimized in those polymerizations in which the aldehyde moieties are susceptible to attack by one of the two free amine groups of an ortho-disposed amine than by an amine group ortho to a Schiff base.

Thus, when the dialdehyde is added slowly to a solution of the tetraamine, so that, at any particular moment, there exists no large excess of aldehyde functions present in the reaction mixture and if, a substantial portion of the Schiff base moieties are oxidatively cyclized, crosslinking is avoided and the polymer remains in solution, even if some di-Schiff base structures are formed and generate branches. However, such branching is substantially reduced, if the dialdehyde addition is performed over a long period of time. The mechanism by which branching occurs is illustrated as follows, using 3,3'-diaminobenzidine (DAB) as representative of

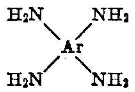

and terephthaldehyde,

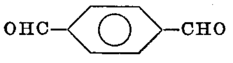 (TAL)

as representative of $Z(CHO)_2$, thus:

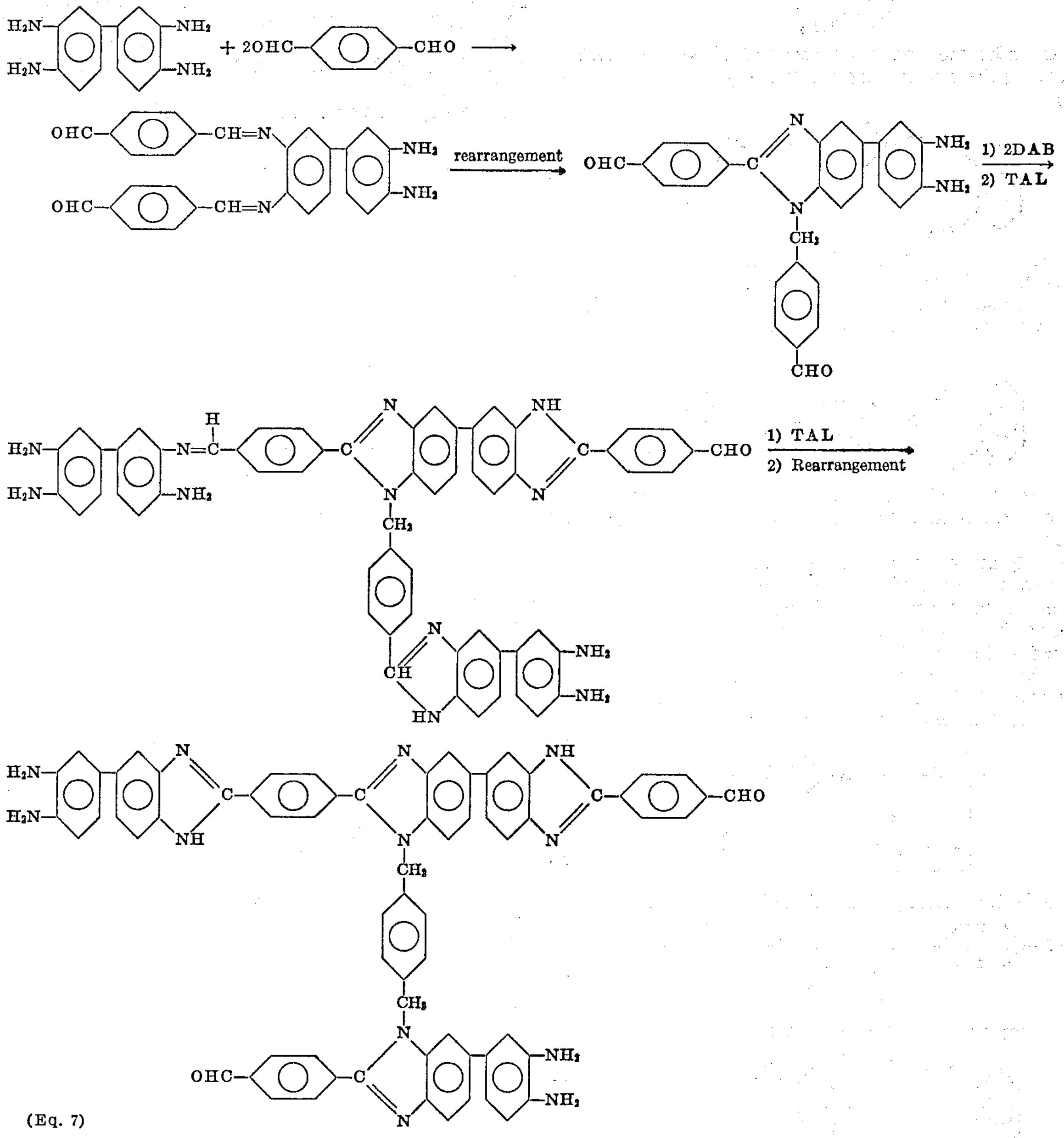

(Eq. 7)

Rearranged molecules of this kind are soluble in the reaction media as crosslinkable oligomers or polymers, which on elimination of the solvent crosslink to fusible polymer in which the crosslink between chains took its origin from the dialdehyde, OHC—Z—CHO, becoming $—CH_2—Z—CH_2—$ as a result of the rearrangement. Also, structures of the type indicated by Equation 7, involves a ratio of *n* moles of

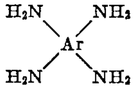

to $n+1$ moles of $Z(CHO)_2$ for each crosslink. In contrast, when $n+1$ moles of

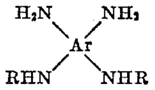

to *n* moles $Z(CHO)_2$ are reacted, oligomers or polymers having terminal

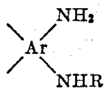

groups are obtained which can be condensed further with other dialdehydes, $Z(CHO)_2$ or bis-glyoxal compounds, $Ar''(COCHO)_2$, as chain extenders.

When copolymers of

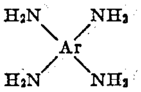

are prepared with other tetraamines such as

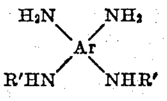

by reaction with $Z(CHO)_2$, such copolymers are also soluble in the reaction media as crosslinkable polymers, which on the elimination of the solvent, form crosslinks between the polymer chains.

It becomes apparent, then, that slightly crosslinked or highly crosslinked polybenzimidazoles are readily prepared by the process of this invention, and that crosslinked copolymers may be readily prepared by reacting the dialdehyde, $Z(CHO)_2$ with mixtures of

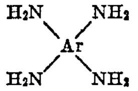

and the substituted tetraamines,

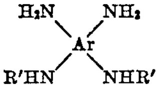

or

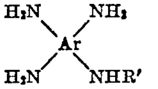

Thus, I have discovered that an exceptional wide variety of benzimidazole-type polymers are conveniently and easily prepared, when a tetraamino compound,

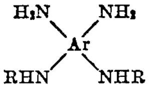

is reacted in solution while being saturated with an oxygen-containing gas, with a dialdehyde, $Z(CHO)_2$, added sufficiently slowly to avoid precipitation.

I have also discovered that incidental amounts of oxygen, such as when the reaction is performed in a system equipped with an open reflux condenser exposed to air, is insufficient to prevent precipitation.

The rate of addition of the aldehyde will depend on a number of factors, such as the reactivity of the specific dialdehydes, the reactivity of the specific tetraamine, the nature of the oxygen-containing gas whether it is 100% oxygen or diluted oxygen such as is air, etc., the nature of the solvent and the temperature at which the polymerization is conducted varying from about 0° C. to the boiling point of the solvent or the reagents. At low temperatures, the rates of the condensation reaction and oxidative ring closure are much slower than at higher temperatures, requiring longer dialdehyde addition time. In general, a temperature range of about 50 to 150° C. is satisfactory, a preferred range being 70–135° C.

The oxygen used in the process of this invention can be oxygen itself or oxygen containing gases such as air or oxygen mixed with inert gases such as nitrogen, helium, argon, krypton, xenon, etc., or with gases which are not reactive with the reagents in the system, such as carbon monoxide, methane, ethane, propane, etc. The oxygen or oxygen-containing gases can be introduced into the reaction system at reduced or atmospheric pressure or at high pressures in excess of atmospheric pressures in reaction vessels designed to withstand such pressures at the temperatures used in the reaction.

In most cases, elemental analysis, infrared and NMR spectroscopy indicate the polymer as prepared in solution, and when isolated as a powder, film or fiber by precipitation or by evaporation of the solvent, as for example, at 130–135° C., may contain, besides imidazole rings, some unreacted functional groups such as —$NH_2$, —CHO, —N=CH— as well as complexed solvent which may detract from the physical properties of the polymers. The maximum properties of the polymer are readily developed by postheating at elevated temperatures in excess of 175° C., preferably in the range of 250 to 400° C. in nitrogen, or 250–350° C. in air. In all cases, however, post heat-treatment is beneficial in eliminating residual solvent and chain extending the polymerization. Post-heated polymers, particularly those in film- and fiber-form, can be converted to shaped chars by slowly and progressively heating the polymer in an inert atmosphere at higher temperatures, up to 1200° C.

I have also discovered that the process of this invention allows easily and readily the preparation of modified polymers and particularly permits the effective control of the molecular weight by a telomerization mechanism, a process which is not feasible by the prior melt polymerization techniques. This telomerization is accomplished by means of reagent molecules which are essentially monofunction relatively to propagation; they prevent propagation of the polycondensation by acting as telomers and become the termini of the polymer chains. For example, a monoaldehyde, R'CHO will act as a telomer, and the average molecular weight of the polymer will depend on the mole ratio of dialdehyde to monoaldehyde, thus:

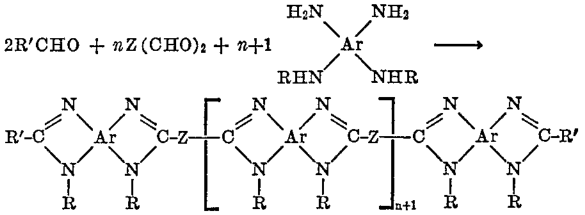

The telomerizing aldehyde, R'CHO, in which R' is a hydrocarbon containing one to eighteen carbon atoms, as previously defined for R when it is not hydrogen, may be aliphatic, aromatic, cycloaliphatic, heterocyclic, etc., and may be an unsubstituted or substituted monoaldehyde and may contain reactive functions which are not aldehydic and which contribute additional specific properties to the polymer. For example, if the aldehyde contains a reactive vinyl or vinylidene group, such groups can be used for further reactions as vinyl compounds and polymerized or copolymerized with other vinyl monomers, by radical or thermal mechanisms. As a further example, if the aldehyde is one, such as furfuraldehyde, that is, reactive to ionic initiation, the telomerized polymer can be subjected to end-coupling by Lewis acids catalysis to yield insoluble, infusible, more fully condensed polymer. Still further, if the aldehyde is a diene aldehyde such as 2,4-hexanedienal, the telomerized polymer can be utilized as a bis-acceptor in Diels-Alder reactions, such as with p-phenylenedimaleimide to produce a polyamide by end-group coupling.

In addition, experimental evidence has shown that, the monoaldehyde, R'CHO, when it is used to modify the reaction between

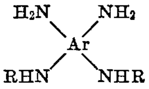

and $Z(CHO)_2$ besides acting as a telomer, generates 1 —$CH_2R'$— substituted benzimidazoles by means of di-Schiff base formation and rearrangement, thus:

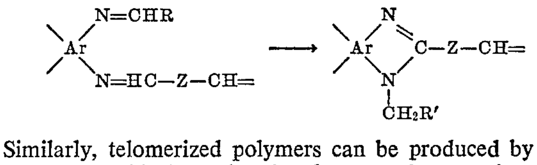

Similarly, telomerized polymers can be produced by the process of this invention by the use of aromatic compounds having an $NH_2$ and a —SH group ortho-disposed to each other of the formula

in which, as previously defined, the divalent moiety Ar'' is equivalent to Ar except that two of the four valencies in Ar are occupied by H and R, a typical example of which is o-mercaptoaniline. When

compounds are used as telomers the termini of the polymer chains have the structure,

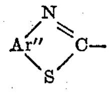

Likewise, telomerized polymers are also obtained by the use of aromatic substituted diamines of the formula

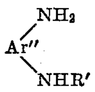

where Ar'' and R' are as previously defined above. When

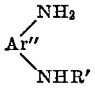

compounds are used as telomers, the termini of the chains have the structure,

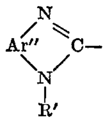

A few typical examples are

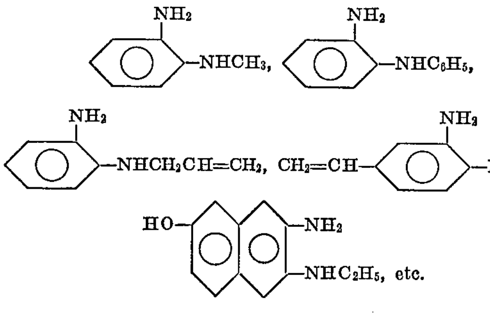

etc.

The aromatic dialdehydes, $Ar''(CHO)_2$ in which the CHO groups are ortho-disposed to each other can also be used as telomers and yield as termini in the chains the structure,

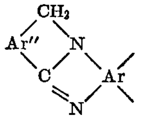

The aromatic ortho-disposed compounds,

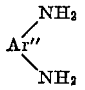

may also be used as telomerizing agents; however, their telomerizing efficiency is lower than

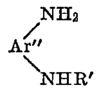

because they tend to react to a great degree with aldehyde functions to form pendant imidazole structures,

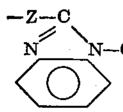

along the backbone of the chain as well as to form imidazole terminii on the chain. Thus, such compositions are copolymers as well as telomerized polymers.

Another particular and useful advantage which is offered by the process and practice of this invention is the relative ease by which either random or block copolymers are prepared by using two or more different tetraamines,

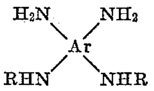

with one or more aldehydes, $Z(CHO)_2$; or two or more aldehydes, $Z(CHO)_2$, with one or more amines,

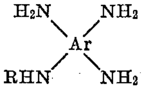

Block copolymers are prepared by first reacting, for example, less than one mole of dialdehyde with one mole of tetraamine followed by the addition of a second aldehyde, or by first reacting one dialdehyde with one tetraamine followed by the addition of a different tetraamine which is then reacted with the same or a different dialdehyde.

Alternately, $(n+1)$ moles of one tetraamine are reacted with $n$ moles of one dialdehyde, to yield amine-terminated chains; separately, $n$ moles of another tetraamine are reacted with $(n+1)$ moles of the same or different dialdehyde to yield aldehyde-terminated chains; then the solutions of the amine-terminated chains and of the aldehyde-terminated chains are mixed and the reaction continued. Also, copolymers are easily prepared by introducing into the mixture other aldehyde-reactable amino compounds such as m- and p-phenylenediamine, 4,4'-diaminodiphenyl, 4,4'-diaminodiphenyloxide and the like, which introduce Schiff-base linkages, $$—ZCH=N\text{-}Ar''—N=CH—$$

into the polymer. One particularly useful thermally-stable copolymer is obtained when part of the tetraamine,

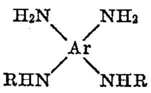

is replaced by the tetravalent azole forming bis-mercaptoanilines,

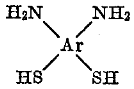

in which Ar has the same meaning previously defined above, in which the $—NH_2$ and —SH groups are ortho-disposed to each other. The

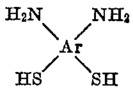

compounds on reaction with aldehyde yield, as the final reaction product, benzthiazole structures,

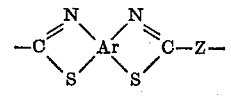

in the backbone of the copolymers, as more fully disclosed in my copending application, Ser. No. 88,476, filed Nov. 10, 1970, now Pat. No. 3,681,297.

The above copolymers, by the process of this invention, are obtained in solution as soluble intermediates which, in their final form, are either free of crosslinkages as when the

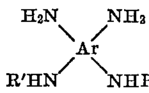 —type amines are used, or which are convertible to crosslinked, insoluble, infusible copolymers in their final form by adjustment of the mole ratio of

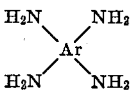

used to the other copolymerizing monomers, such as

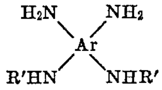

or

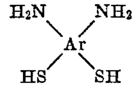

The particular process of this invention does not appear to be a general one, and while it has been established as operative for the tetraamino compounds,

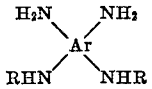

the corresponding bis-phenols,

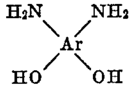

do not, when reacted with dialdehydes, $Z(CHO)_2$, yield the polybenzoxazoles; rather the polymeric Schiff bases,

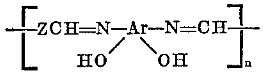

are obtained which could not be cyclized, even after isolation, to the oxazole polymers,

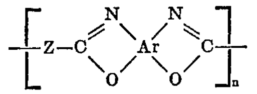

even by strong chemical oxidizing agents at elevated temperature. Similarly, the polybenzoxazinones are not obtained when dialdehyde, $Z(CHO)_2$, are reacted with the corresponding aminoacids,

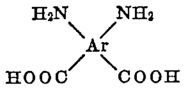

by the process of this invention.

The polymers of this invention are particularly useful in the preparation of thermally stable heat-resistant fibers, films, laminated products, molded objects, varnishes for wire, impregnants for porous bodies, including foams and honeycombs, etc.

The following examples illustrate the practice of this invention and are not intended to limit the invention in any way.

POLYMERIZATIONS

Example 1

(a) Equimolar quantites of 3,3′-diaminobenzidine and terephthaldehyde or isophthaldehyde are reacted as melts, by the procedure of N. A. Androva, A. M. Dubnova and M. M. Koton, Vysokomolekul Soedin, 6 (8), 1493–5 (1964), at 250–270° C. for three hours and for one hour at 250–270° C. at 0.1 mm. Hg pressure to yield insoluble, infusible dark-brown "polybenzimidazoline" polymers.

(b) A mixture of 10.70 g. of 3,3′-diaminobenzidine (49.9 mmoles) and 6.7 g. of terephthaldehyde (49.9 mmoles) is ground together under nitrogen and heated in a Pyrex reactor tube under a nitrogen atmosphere as a melt at 260° C. The melt solidifies rapidly and the heating is continued for two hours at atmospheric pressure and for one hour at 0.5 mm. Hg pressure to yield a granular, brittle, heterogeneous brown-black mass, which is insoluble in dimethylacetamide, and concentrated sulfuric acid.

(c) The procedure of Example 1(b) is repeated and the melt polymerization is performed in the presence of air; an infusible, insoluble black product is obtained.

The polymers of Example 1 are unsatisfactory for the preparation of films, fibers or adhesives, and for like uses.

Example 2

(a) In 100 ml. of DMAC is dissolved 10.7 g., 50 mmoles of 3,3′-diaminobenzidine which is added to a solution of 6.70 g., 50 mmoles of terephthaledhyde dissolved in 70 ml. of DMAC, following which the mixture is heated under a nitrogen atmosphere to 90° C. for one and one-half hours and a quantitative yield, 15.6 g., of a red polymeric precipitate, insoluble in dimethylacetamide and only slightly soluble in concentrated sulfuric acid is obtained.

(b) The procedure of Example 2(a) is repeated except that the mixture is heated after mixing and instead of nitrogen a stream of air is passed through the solution and a quantitative yield of a red precipitate is obtained after one and one-half hours at 90° C. The polymer is insoluble in dimethylacetamide and only slightly soluble in concentrated sulfuric acid.

(c) The procedure of Example 2(a) is repeated at 135° C. and a red product similar to that of Example 2(a) is obtained. The product of this example is insoluble in DMAC and concentrated sulfuric acid, and contains a high concentration of uncyclized Schiff base linkages.

The polymers of Example 2 are unsuited for the preparation of films, fibers or adhesives, and for like uses.

Example 3

(a) In a 200-ml. three-neck, round-bottom flask equipped with a stirrer, reflux condenser, gas inlet and outlet tubes, heating means, etc., are placed 100 ml. of dimethylacetamide, to which is added 0.6310 g. of 3,3′-diaminobenzidine and 1.0388 g. of terephthaldehyde-bis(bisulfite adduct), yielding a solution containing only about 1.6% solids. The mixture is heated to reflux temperature and within fifteen minutes precipitation occurs which increases with reaction time. At the end of five hours of reaction, 0.764 g. of the precipitate is filtered from the solution, washed with water and dried; yield, 0.764 g. (67% of theoretical). The polymer is insoluble in DMAC, and only partially soluble in formic acid. The inherent viscosity, $\eta_{inh}$, measured at 0.040 g. in 100 ml. of formic acid is 0.45 and the intrinsic viscosity, at C→O, is 0.34.

(b) The procedure of Example 3(a) above is repeated using 30 ml. of dimethylacetamide, yielding a solution containing approximately 5.5% solids, and the mixture heated to reflux. At the end of one hour of reaction, 0.98 g. (86%) of insoluble product is isolated by filtration.

The polymers of Example 3 are unsuitable for the preparation of films, fibers or adhesives, and for similar uses.

Example 4

Into a 100-ml. three-neck, round-bottom flask equipped with a dropping funnel, thermometer, water condenser, and capillary inlet is placed 3,3′-diaminobenzidine (2.1598 g., 9.875 mmoles) and 50 ml. DMAC. The amine solution is heated to 105–110° C., and a rapid stream of air is passed into the amine solution through the capillary while terephthaldehyde (1.3245 g., 9.875 mmoles) in 10 ml. DMAC is added slowly dropwise to the amine solution. Approximately 90% of the aldehyde is added in thirty minutes, the remainder is added over a period of forty minutes. The percent of solids in the solution is approximately 5.8%. The reaction mixture is heated at 105–110° C. for a toal of two hours, yielding a viscous orange-red solution. Films cast from this solution and dried at 110° C. are yellow-brown, flexible, and clear. Additional heating at 105–110° C. for ninety minutes causes the reaction mixture to become very viscous. An aliquot of the reaction product is dispersed in, blended and washed with ethanol and dried in vacuo, yielding a finely powdered yellow-brown polymer: $[\eta]=0.67$ dl./g. (conc. $H_2SO_4$, 20° C.); IR (KBr disc) 3240, 1620, 1440, and 1280 $cm.^{-1}$.

A sample of the solution, cast as a film at 135° C. for one hour shows that the solvent dimethylacetamide is retained strongly by the polymer. However, on drying at 250–270° C. in air for four hours, the solvent is eliminated substantially, and its elemental analysis indicates that the degree of polymerization of the film is extremely high. Analysis.—Calc'd for $(C_{20}H_{12}N_4)_{n=\infty}$: (percent): C, 77.92; H, 3.89; N, 18.18. Found (percent): C, 77.85; H, 3.94; N, 18.15. The film after heating, is no longer soluble in dimethylacetamide and only very slightly soluble in concentrated sulfuric acid at room temperature, indicative of a crosslinked polymer.

A thermogravimetric analysis, at a heat rate of 15° C. per minute performed on the film shows an inflection point in nitrogen of 620° C. and 71% char residue at 1200° C., and an inflection point in air of 550° C. with a temperature of complete combustion at 760° C.; these values compare with 580° C. and 63% in nitrogen and 550° C. and 720° C. in air respectively, for the comparable polybenzimidazole prepared by the melt process from the diphenylterephthalate ester and diaminobenzidine.

Example 5

Into a 50-ml. three-neck, round-bottom flask equipped with a dropping funnel and air capillary inlet are placed 3,3'-diaminobenzidine (1.0694 g., 4.991 mmoles) and 11 ml. DMAC. The amine solution is warmed to 50° C. and a rapid stream of air is passed through the reaction mixture from the capillary inlet. Terephthaldehyde (0.6694 g., 4.991 mmoles) in 7 ml. DMAC is added dropwise to the amine solution over a period of thirty minutes to yield a red-brown homogeneous solution which becomes increasingly viscous as the reaction proceeds for a period of five hours at 50° C. Films cast from aliquots of the solution become increasingly clear and flexible as the reaction proceeds. As a function of reaction time, the color of the cast films vary from red to orange to brownish-yellow and the shade of color depends on the extent of cyclization of the amino-Schiff base moieties. A red color of the solution at the end of short reaction times, is indicative of a low degree of cyclization and a yellowish color is indicative of a high degree of cyclization. Further, depending on the rate of evaporation of the solvent, if the color of the solution is yellow, the color of the dried films will vary from reddish-yellow to brownish-yellow. If the color of the solution is red, red films are obtained when the solvent is evaporated rapidly so that the amino-Schiff base moieties are unable to cyclize and oxidize to imidazole moieties as a result of the too rapid attainment of an intractable state. Postheating, however, at high temperatures, completes the reaction. In contrast, yellow films are obtained, even from red solutions, when the solvent is evaporated slowly, allowing thereby the facile cyclization and oxidation of the amino-Schiff base moieties.

At the end of the five hours of reaction time, at 50° C., the solution is homogeneous, and the percent elemental analysis for a film dried for two hours at 135° C. is C, 73.78; H, 4.52; N, 17.95; O, 3.85, which on drying for twenty-four hours at 300° C., becomes C, 77.84; H, 3.92; N, 18.14.

Instead of dimethylacetamide, solutions of the polymer can be prepared in dimethylformamide, dimethylsulfoxide, butyrolactone, meta-cresol and tetramethylurea.

Example 6

The procedure of Example 4 is repeated using 4.38 g. of

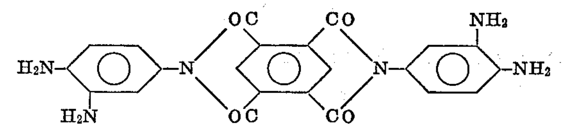

in place of the 3,3'-diaminobenzidine and there is obtained the polymer containing the structural unit

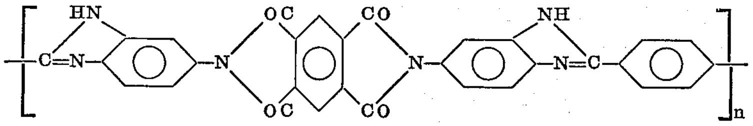

The above tetraamine of Example 6 is prepared readily by reaction of pyromellitic anhydride with either 3,4-dinitroaniline followed by catalytic reduction with hydrogen or with 2-nitro-p-phenylenediamine followed by catalytic reduction.

Example 7

The procedure of Example 4 is repeated using 4.177 g. of

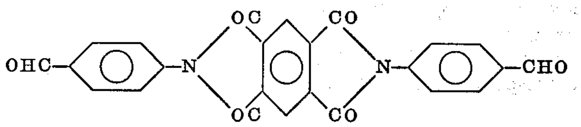

instead of the terephthaldehyde and there is obtained the polymer containing the structural unit

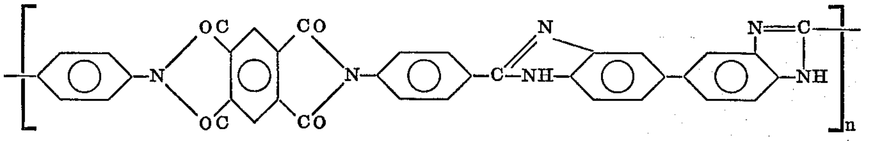

The above dialdehyde of this Example 7 is readily prepared by reaction of pyromellitic anhydride and p-aminobenzaldehyde.

Example 8

The procedure of Example 4 is repeated using 4.33 g. of the tetraamine of Example 6 in 50 ml. of dimethylformamide and 4.177 g. of the dialdehyde of Example 7 and there is obtained the polymer containing the structural unit

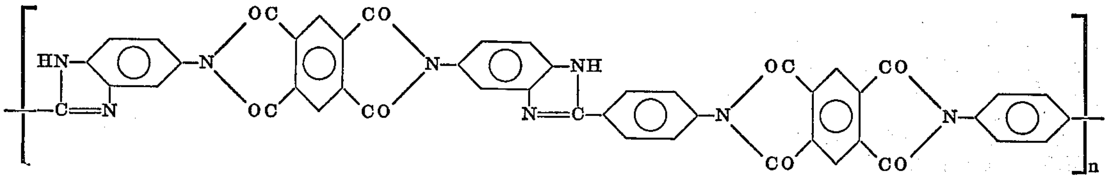

Example 9

The procedure of Example 4 is repeated using 3.713 g. of

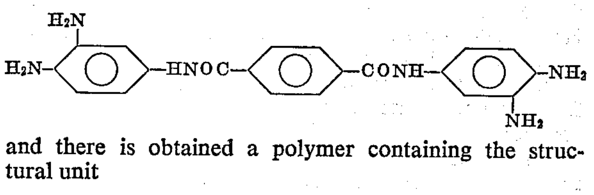

and there is obtained a polymer containing the structural unit

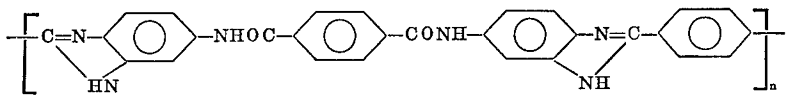

The above tetraamine of this Example 9 is readily prepared by catalytic reduction of the amide obtained by the reaction of diphenylterephthalate with 3,4-dinitroaniline.

Example 10

A series of modified telomerized polymers are prepared using benzaldehyde as the telomer by the following typical procedure in which 10 mole percent of benzaldehyde is used as the telomer.

Into a 50-ml. three-neck, round-bottom flask equipped with a dropping funnel and air capillary inlet are placed 3,3'-diaminobenzidine (0.8934 g., 4.170 mmoles) and 9 ml. DMAC. The solution is heated to 50° C., a stream of air is passed through the solution, and a mixture of terephthaldehyde (0.5314 g., 3.962 mmoles) and benzaldehyde (0.04 ml., 0.42 mmole) in 6 ml. DMAC is added dropwise over a period of one hour. The solution, at the end of twelve hours, is very viscous, and homogeneous, and free of precipitate. In the course of the reaction the color changes from red-brown to yellow-orange. Continuous flexible films are cast at 135° C. from the solution, which are brownish-yellow when heated in air at 250° C. Then, the reaction mixture is precipitated in 95% ethanol, filtered, and dried to yield 1.30 g. (99%) polymer: $[\eta]=0.61$ dl./g. (conc. $H_2SO_4$, 20° C.). The infrared spectrum shows the characteristic polybenzimidazole absorption bands.

The intrinsic viscosities of a series of telomerized polybenzimidazoles in which the mole percent of telomer is varied, and in which the reaction conditions are similar to the above example are given in the following table together with the thermogravimetric data.

| Mole percent of telomer | $[\eta]$ [1] (dl./g.) | TGA atmosphere | Inflection point,[2] ° C. | Temp. of complete sample combustion in air, ° C. | Char residue at 1176° C. in nitrogen, percent |
|---|---|---|---|---|---|
| 5 | 0.68 | $N_2$ | 560 | | 64 |
| | | Air | 540 | 680 | |
| 10 | 0.61 | $N_2$ | 460 | | 54 |
| | | Air | 450 | 630 | |
| 20 | 0.49 | $N_2$ | 430 | | 54 |
| | | Air | 420 | 610 | |
| 30 | 0.30 | $N_2$ | 400 | | 52 |
| | | Air | 390 | 600 | |

[1] Conc. $H_2SO_4$, 20° C.
[2] Temperature at which TGA thermogram indicates onset of sample decomposition.

The data of the table show that these reactions performed at 50° C., in the presence of excess air and with the slow addition of terephthaldehyde and benzaldehyde yielded organic-solvent soluble polymers which do not precipitate even when heated for twelve hours and that the intrinsic viscosities decreases regularly as the concentration of benzaldehyde is increased. The regular decrease in molecular weight is in accord with the theory of condensation polymerization. However, the decrease in intrinsic viscosity is not described exactly by the equation $$\log [\eta]=K\ [\log 1/1\text{-}[DAB]]$$

in which [DAB] is the concentration of 3,3'-diaminobenzidine, and this indicates that factors other than telomerization are operative.

For benzaldehyde to be an effective telomer it must form a benzimidazole ring by reaction with an ortho-diamine moiety. However, benzaldehyde is also capable of yielding N-substituted benzimidazoles by reaction with an amine function of an amino-Schiff base followed by subsequent rearrangement of the di-Schiff base, as shown in the prototype systems. When the amino-Schiff base is an N-benzylidene-type, the reaction results in a telomerization and restricts the molecular weight of the polymer, and the formation of a soluble polymer, thus:

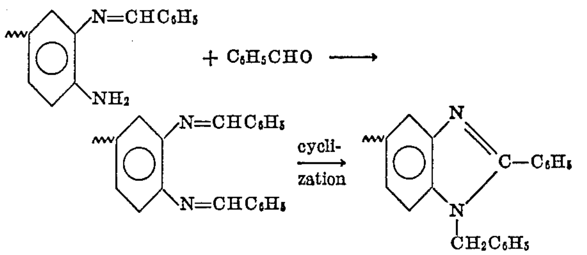

However, when the amino-Schiff base is an N-xylylidene-type, the reaction would yield a benzyl substituted benzimidazole segmer in the chain, thus:

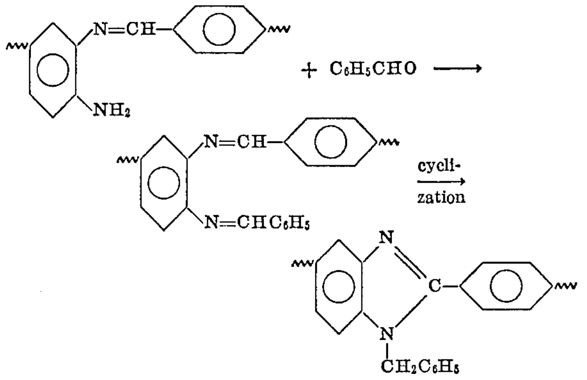

The introduction of such N-substituted benzimidazole structures into the polymer increases the solubility of the polymer by eliminating the interchain hydrogen bonding which is present in the n-unsubstituted benzimidazoles in the one-position, as well as eliminating or reducing the possibility of crosslinking by the dialdehyde. Thus, the use of benzaldehyde in benzimidazole syntheses beneficiates the solubility of polymers as a result of both telomerization of the polymer and the introduction of N-substitution in the polymer.

Maximum N-substituted benzimidazole structures are obtained when each mole of tetraamino compound is reacted with two moles of monoaldehyde and one mole of dialdehyde; in such a case side reactions are avoided by first forming the bis-Schiff base of the tetraamino compound by reaction with the monoaldehyde and thereafter reacting the bis-Schiff base with the dialdehyde, thus:

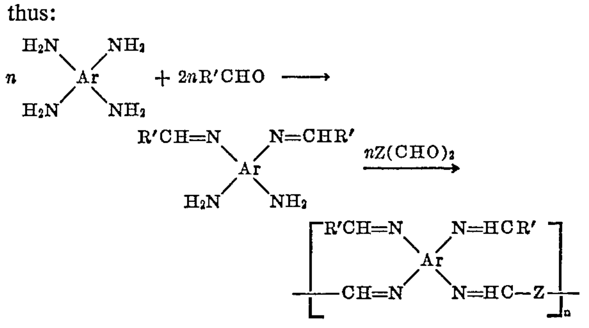

which rearranges to

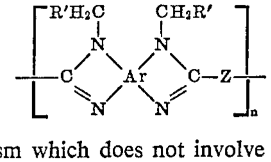

by a mechanism which does not involve oxidation.

The data in the table show also that the thermal stabilities of the telomerized polymers are high, and that there is a decrease in thermal stability as the concentration of benzaldehyde is increased. This is not unexpected since the degree of polymerization decreases with an increase in telomer concentration; notable is the fact that even at 30 molar percent of monoaldehyde, the thermal stability is still exceptionally high.

Instead of the benzaldehyde of this example, there may be used the telomerizing agent an equivalent amount of acetaldehye, heptaldehyde, naphthaldehyde, cyanobenzaldehyde, hexahydrobenzaldehyde, acetamidobenzaldehyde, o-anisaldehyde, 9-anthraldehyde, 4-carboxymethylbenzaldehyde, salicylaldehyde, 3,4-dihhlorobenzaldehyde, 4-(diethylamino) - benzaldehyde, 5 - indaniarboxaldehyde, mestialdehyde, 1-pyrenecarboxaldehyde, syringaldehyde, chloral, 2-ethylhexanol, glyceraldehyde, cinnamaldehyde, phenylacetaldehyde, phenylpropargylaldehyde, furfuraldehyde, indole - 3 - carboxaldehyde, N - methylpyrrole-2-carboxaldehyde, 5-methyl-2-thiophenecarboxaldehyde, 2-thiophenecarboxaldehyde, 3 - cyclohexen - 1-carboxaldehyde, 2-pyridenecarboxaldehyde, 5-norbornene-2-carboxaldehyde, acrolein, methacrolein, vinylbenzaldehyde, crotonaldehyde, etc.

Example 11

This example illustrates telomerization by means of 10 mole percent of o-phenylenediamine.

(A) Into a 100-ml., three-neck, round-bottom flask equipped with a capillary inlet, dropping funnel, thermometer, and reflux condenser are placed 3,3'-diaminobenzidine (1.90 g., 8.871 mmoles), o-phenylenediamine (0.0989 g., 0.934 mmole), and 45 ml. DMAC. The amine solution is heated to 105–110° C. and a stream of air is passed through the capillary into the solution while terephthaldehyde (1.2525 g., 9.348 mmoles) in 10 ml. DMAC is added dropwise from the dropping funnel. Approximately 90% of the aldehyde is added within thirty minutes. The remainder is added very slowly over a period of forty minutes and the resulting solution is heated an additional hour.

A 5 ml. aliquot of the reaction solution is precipitated in ethanol. The resulting solid is collected by filtration and dried to yield 0.20 g. of polymer, $[\eta]=0.35$ dl./g. (conc. $H_2SO_4$, 20° C.). The reaction solution is heated an additional hour at 110° C. to yield an orange solution; films cast from a sample of this solution at 110° C. are brown-yellow. The solution is percipitated in ethanol, filtered, and dried to yield 2.31 g. of DMAC-soluble polymer: $[\eta]=0.42$ dl./g. (conc. $H_2SO_4$, 20° C.).The thermal stability of the telomerized polymer is very good; its inflection point in nitrogen is 520° C., leaving a char residue of 64% at 1200° C., and its inflection point in air is 500 ° C.

(B) The above procedure is repeated using a phenylenediamine at mole concentration of 2 and 5% giving polymers of higher intrinsic viscosity, and at 20% to give the lower intrinsic viscosities than when 10% mole percent of telomer is used.

On the basis of the above results, there does not appear to be a direct correlation between the intrinsic viscosities of the polymer and the concentration of o-phenylenediamine. This would indicate that factors other than telomerization alone are operative. In order to be an effective telomer, the o-phenylenediamine must form a benzimidazole by reaction with an aldehyde moiety, thus:

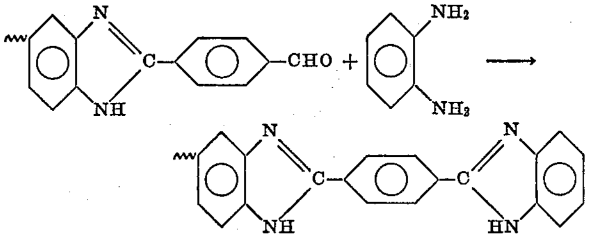

However, the failure of the amino-Schiff base, from the reaction of an aldehyde function with o-phenylenediamine, to cyclize would result in a site for continued polymerization, in which an imidazole structure becomes an appendage to the chain:

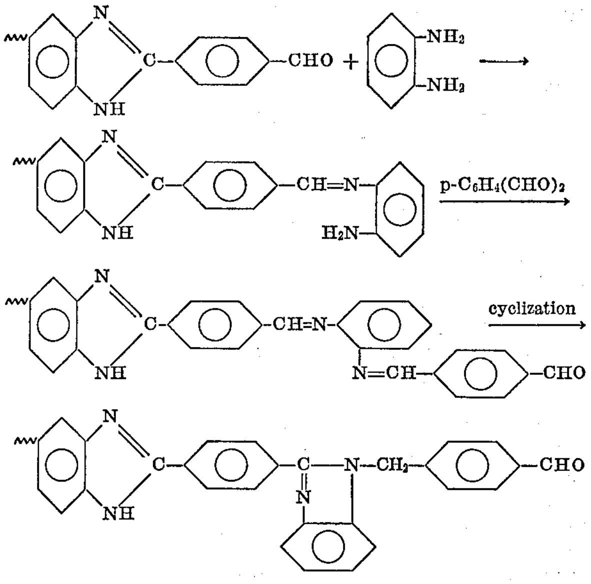

Thus, as the amount of o-phenylenediamine in the polymerization reaction is increased so is the probability of such participation by o-phenylenediamine in the polymer growth, at the expense of telomerization, and thus the proportionality is not a direct function. However, such is not the case when a mono-substituted diamine,

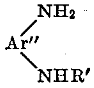

in which R' is a hydrogen containing one to eighteen carbon atoms, or a mercaptoaniline,

are used as the telomers; in both these later cases, the reduction in intrinsic viscosity is proportional to the concentration of

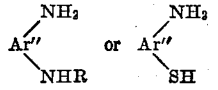

used.

Example 12

In a reaction vessel equipped with a stirrer, reflux condenser, gas outlet and inlet and heating mantle is placed 2.42 g. (0.01 mole) of 3,3'-di-(methylamino-benzidine,

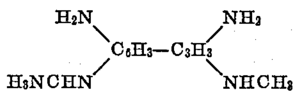

in 35 ml. of dimethylacetamide. The amine solution is heated to 110° C. and a rapid stream of air is passed through the solution while 1.34 g. (0.01 mole) of terephthaldehyde in 15 ml. of DMAC is added dropwise over a period of sixty minutes to yield a viscous solution which can be cast at 130° C. followed by heating at 250° C. for twenty-four hours, to yield flexible, tough yellow films of the polymer containing the repeating unit

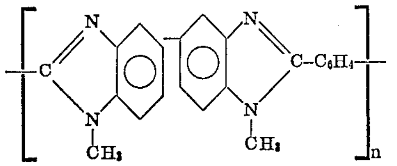

Example 13

The procedure of Example 12 is repeated except that $O_2$ is used instead of air and passed through the solution more slowly; there is obtained a solution of the polymer substantially identical to that of Example 12.

In a similar manner, when instead of the di-(methylamino)benzidine of this example and of Example 12, there are used the substituted tetraamino compounds of the formula,

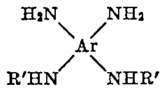

in which R′, besides methyl, is ethyl, propyl, vinyl, butyl, allyl, crotyl, phenyl, etc., the corresponding polybenzimidazoles,

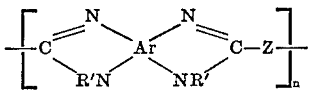

are obtained.

Example 14

In a reaction vessel equipped as in Example 4 is placed 2.42 g. of 3,3′-di-(methylamino)-benzidine in 25 ml. of dimethylacetamide. The amine solution is heated to 90° C. and a stream of nitrogen is passed through the solution while 1.474 g. of terephthaldehyde in 15 ml. of dimethylacetamide is added dropwise over a period of one hour, yielding a viscous solution. Then, 2.14 g. of 3,3′-diaminobenzidine in 25 ml. of dimethylacetamide is added to the viscous solution and a rapid stream of air is passed through the solution while 1.206 g. of terephthaldehyde is added slowly dropwise over one hour, yielding a solution of a block copolymer, which is cast at 130° C. in air for six hours, followed by heating at 250° C. for twenty-four hours, yielding a tough, flexible, crosslinked film.

Example 15

In 50 ml. of DMAC there is dissolved 3.92 g. (0.01 mole) of

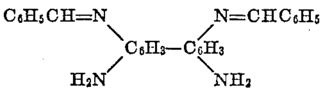

(obtained as a prototype monomer by reaction of one mole of

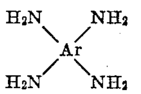

with two moles of R′CHO), and an inert atmosphere is established in the reaction by passing nitrogen into the system by means of an inlet tube. Then, 1.34 g. of terephthaldehyde in 30 ml. of DMAC is added slowly to the solution, while air is passed through the solution and the mixture progressively heated from 25° C. to 115° C. during the course of one hour, to yield a polymer solution containing 1,1′-substituted benzimidazole units

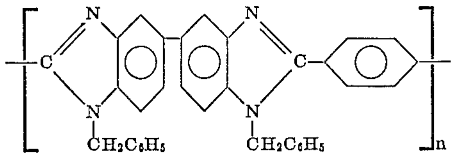

Example 16

The procedure of Example 10 is repeated using instead of 10 mole percent of benzaldehyde, there is used an equivalent amount of p-vinylbenzaldehyde as the telomerizing agent to give similar polymers, except that the end- and pendant-groups possess the styryl moiety, $$CH_2{=}CHC_6H_4—$$

instead of the phenyl moiety,

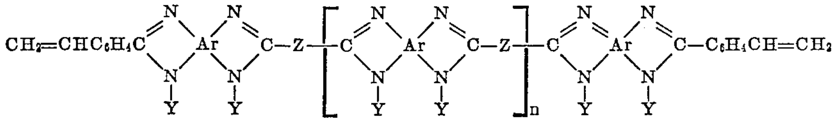

in which Y is H— or $CH_2{=}CHC_6H_4CH_2—$.

Thermal treatment of these polymers alone, or in the presence of radical generating catalysts, such as benzoyl peroxide, tertiary butyl peroxide, tertiary butyl peracetate, cumene hydroperoxide and the like, yields polymers crosslinked through the vinyl groups.

To a solution in DMAC of the polymer containing 10 mole percent of p-vinylbenzaldehyde reacted as a telomer is added 0.5% by weight of the polymer of tertiary butyl perbenzoate. The solution is cast on glass and dried at 135° C. for four hours, at 200° C. for four hours and yields a film insoluble in concentrated sulfuric acid.

Example 17

Substitution of an equivalent weight of 2,4-hexadienal, $CH_3CH{=}CH—CH{=}CHCHO$, for the vinyl benzaldehyde of Example 16, yields polymers modified by $$CH_3CH{=}CH—CH{=}CH—$$

moieties. Such polymers are useful in post-reactions, as for example, by coupling with p-phenylenedimaleimide,

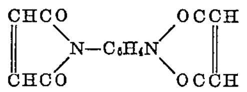

To a solution of the polymer of this Example 17 is added as a 5% solution in DMAC, 0.21 mole of p-phenylenemaleimide and an increase in viscosity is observed as a result of a 1,4-Diels-Alder addition of the dimaleimide to the diene telomerized polymer.

Example 18

Substitution of an equivalent amount of 2-pyridinecarboxaldehyde for the benzaldehyde of Example 10, yields a polymer containing pyridine groups which make the polymer actively receptive to acid dyes.

Example 19

The procedure of Example 12 is repeated using an equivalent amount of the tetraacetal, $$p\text{-}C_6H_4[CH(OC_2H_5)_2]_2$$

instead of terephthaldehyde and a polymer similar to that of Example 12 is obtained.

Example 20

The procedure of Example 12 is repeated using an equivalent amount of the di-Schiff base derivative, p-xylylidene-di-methylamine, $p\text{-}C_6H_4(CH{=}NCH_3)_2$ instead of terephthaldehyde and a polymer equivalent to that of Example 12 is obtained.

Example 21

A mixture of 24.2 parts of 3,3'-di-(methylamino)-benzidine

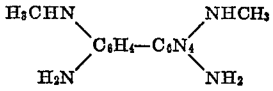

in 300 ml. of dimethylacetamide and 10.1 parts of glutaric aldehyde it 150 ml. of dimethylacetamide are reacted by the process of Example 12 to yield a polymeric imidazole in which —Z— is $-(CH_3)_2-$,

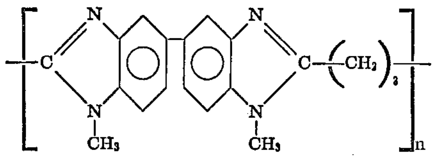

When, in this example, the glutaric ethylacetal, $$(C_2H_5O)_2HC(CH_2)_3CH(OC_2H_5)_2$$

is used instead of the glutaric aldehyde, substantially the same polymer is obtained.

Example 22

A reticulated polyurethane foam having 40 pores per square inch is impregnated and coated with the polymer solution of Example 4 and dried at 135° C. for four hours, and at 175° C. for twenty-four hours; the final increase in weight after drying is approximately 16%. The impregnated and coated reticulated foam retains its shape when heated to 200° C. whereas an unimpregnated control sample distorts and collapses, losing its identity and showing evidence of serious degradation. When the control sample is immersed in kerosene at 100° C., it disintegrates within three hours, whereas the impregnated sample is undamaged.

By repeated immersion in the polymer solution, increased amounts of polymer are deposited on the reticulated foam to structures containing 50% or higher of the polymers. Such composition can be heat-treated to progressively higher temperatures in an inert atmosphere, as for example, up to 700–800° C., to produce reticulated char structure on which pyrolytic graphite can be deposited.

Example 23

A polymer solution prepared by the procedure of Example 4 is transferred to a dip-tank blanketed with nitrogen or an inert gas, and through the solution is passed continuously copper wire to coat it. Then the coated wire is passed through a forced-air heated oven, the first section of which is heated to 140–150° C., then to a second section heated to 250° C., and through a third section heated to 300° C. The dried coated wire is wound on a 0.25 inch mandrel, without rupture of the coating. The coated wire is then random-wound on an uninsulated metal spool and connected in series with a 110 volt current to one lead of an electric bulb, the other lead of which is connected through a fuse to the grounded side of the line. The core of the metal spool is also connected through the same fuse to the grounded side of the line so that if insulation failure occurs, the fuse will be blown and the light would cease to operate. The random-wound coil is placed in an oven heated to 225° C.; failure does not occur within a period of ninety days, after which the experiment is terminated.

Example 24

The procedure of Example 4 is repeated and the solution is filtered while maintained in the absence of air and then is concentrated in a falling film evaporator at 0.1 mm. to a polymer concentration of approximately 28% and extruded through the orifice of a fine hypodermic needle into 50% dimethylacetamide-50% water mixture to yield continuous fibers which are washed with water until free of solvent and dried at 110° C. in air. Curing is completed by drying in air at 170° C. and by drawing at 300° C. in air. Soft, ductile fibers are obtained, which are insoluble in concentrated sulfuric acid.

Example 25

The procedure of Example 4 is repeated except an equivalent amount of tetrachloroterephthaldehyde is used instead of the terephthaldehyde, and a self-extinguishing flame-retardant polymer, whose elemental analysis agrees well with the theoretical composition, is obtained. The tribromo- and tetrabromo-terephthaldehyde and m-phthalaldehyde also yield highly flame-retardant polymers. The replacement of at least 5 mole percent of $Z(CHO)_2$ compounds by the tri- and tetra-halo compounds also yield flame-retardant polymers.

In contrast, the melt reaction at high temperatures between diphenyltetrachloroterphthalate and 3,3'-diaminobenzidine yields insoluble, infusible products of indefinite composition which are deficient in chlorine, due to side reactions of the halogens with the tetraamino compound and to decomposition of the halo-reactants and products at the high temperatures required. Similar decomposition products are obtained when diphenyl-tri- and -tetrabromophthalate ester are used.

Example 26

The procedure of Example 4 is repeated except that 0.16 parts of 3-vinyl isophthaldehyde,

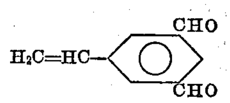

and 1.192 parts of terephthalate are used instead of 1.3245 parts of terephthaldehyde and a polymer containing about 10 mole percent of crosslinkable and copolymerizable structures in the polymer chain is obtained.

Example 27

The procedure of Example 4 is repeated using 118.45 parts of 3,3'-dimercaptobenzidine, 105.0 parts of 3,3'-diaminobenzidine, 147.4 parts of terephthaldehyde and 600 parts of dimethylacetamide to yield a solution from which crosslinked, infusible films are obtained when cast and treated at 200° C. for two hours, due to the formation of p-xylylidene bridges between the imidazole linkages in the copolymer.

Example 28

The procedure of Example 27 is repeated using 121 parts (0.5 mole) of 3,3'-di(methylamino)benzidine, 107 parts (0.5 mole) of 3,3'-diaminobenzidine, 140.7 parts (1.05 mole) of $m\text{-}C_6H_4(CHO)_2$ and 600 ml. of dimethylformamide and crosslinked and infusible films are obtained when the solution is cast and treated as in Example 27.

Example 29

The following example illustrates the formation of polymers of this invention terminated by amine functions by reaction of $n$ moles of $Z(CHO)_2$ with $n+1$ moles of the tetraamine, in which $n$ has a value of at least one, and may be as high as ten to twenty, to yield products having the general structure

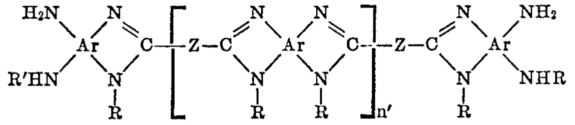

wherein $n'=n-1$.

in m-cresol. Then 50 parts of dimethylacetamide is added, the mixture maintained at 110° C., a stream of air is passed through the solution as 1.34 parts of terephthaldehyde in 10 parts of dimethylacetamide is added slowly over the period of thirty minutes to yield a polymer solution of high viscosity, having the repeating unit

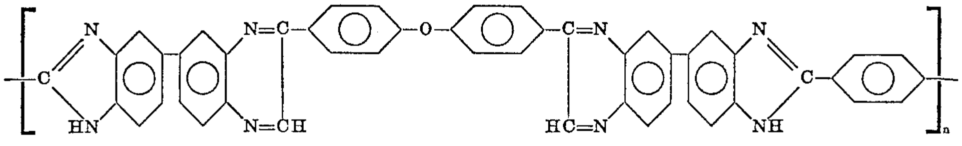

(a) In this specific example the mole ratio of $Z(CHO)_2$ to the tetraamine is 5:6. The procedure of Example 4 is used to react 12.84 parts of 3,3'-diaminobenzidine in 250 ml. of DMAC with 6.70 parts of terephthaldehyde in 60 ml. of DMAC at 110° C. for sixty minutes and a polymer solution of low viscosity and of low molecular weight is obtained which is stable over long periods of time and which forms brittle, powdery films which are soluble in DMAC. These low viscosity solutions are particularly suitable as impregnants for porous bodies such as wood, as well as paper, cloth, etc., in the form of sheets, honeycombs, etc. The polymer contains terminal diamino groups which, however, can be end-coupled to yield high molecular weight products. End-coupling is readily achieved by reaction with additional quantities of polycarbonyl compounds such as the dialdehydes, such as $Z(CHO)_2$, R'OCOC—Z—COCOR' where Z and R' have the same meaning as described hereinabove, or any other suitable coupling or crosslinking reagents such as polyisocyanates, polyepoxy compounds, polycarboxylic acid anhydrides, etc., for example, toluene diisocyanate, bis-phenyldiglycidyl ether, pyromellitic dianhydride, etc.

(b) To the solution of Example 29(a) is added 1.34 parts of terephthaldehyde dissolved in 10 parts of DMAC and mixed thoroughly. A sample of the solution cast and heated at 110° C. for two hours, at 135° C. for two hours, at 200° C. for one hour and at 250° C. for twelve hours yields a non-brittle film.

(c) Instead of 1.34 parts of terephthaldehyde as in Example 29(b) above, there is added 2.68 parts of terephthaldehyde in 20 parts of DMAC, and a crosslinked film is obtained when the solution is cast as a film and heated as in 29(b) above.

(d) To a solution of Example 29(a) is added 2.82 parts in 10 ml. DMAC of diphenyleneoxidediglyoxal, $OHCCOC_6H_4—O—C_6H_4COCHO$, and the mixture heated at 110° C. for one hour with an increase in viscosity and there is obtained a polymer having quinoxaline as well as imidazole linkages:

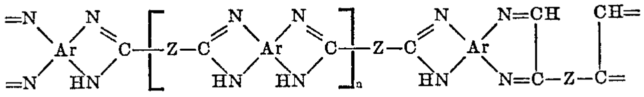

Example 30

To 4.28 parts of 3,3'-diaminobenzidine in 20 parts of meta-cresol, 2.82 parts of p-diphenyleneoxidediglyoxal is added and the mixture reacted at 150° C. for three hours with the elimination of water to yield 7.1 parts of bisquinoxaline,

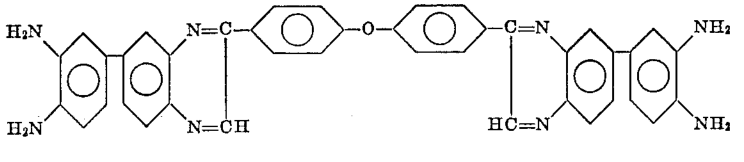

in which substantially most of the imidazole and quinoxaline units alternate, representing a copolymer-type structure of the class,

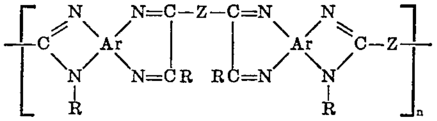

Other tetracarbonyl compounds represented by $Z(COCOR')_2$ which can be used instead of $O(C_6H_4COCHO)_2$ for example, are $CH_3COCOC_6H_4COCOCH_3$, $OHCCOC_6H_4COCHO$

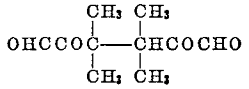

as well as the cyclic tetraketone, for example

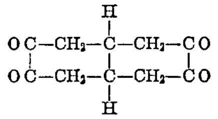

etc.

Example 31 structure

This example illustrates the formation of the polymers terminated by aldehyde functions by reaction of $n+1$ moles of $Z(CHO)_2$ with $n$ moles of the tetraamine, in which $n$ has a value of at least one and may be as high as ten or twenty, to yield products having the general

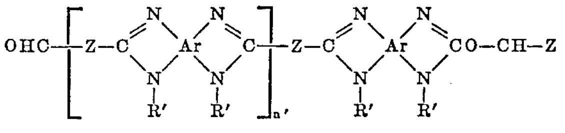

wherein $n'=n-1$. This product is analogous to and the counterpart of the amine-terminated products of Example 29(a). In this example the mole ratio of $Z(CHO)_2$ to the tetraamine is 6:5. The procedure of Example 12 is used to react 12.0 parts of 3,3'-di-(methylamino)benzidine,

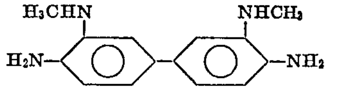

in 250 ml. of DMAC with 8.04 parts of terephthaldehyde in 64 parts of DMAC at 110° C. for thirty minutes to yield a solution of low viscosity. The polymer contains terminal CHO groups which can be coupled or extended by reaction with additional quantities of the original 3,3'-di-(methylamino)-benzidine, or by 3,3'-di-aminobenzidine or in general by any of the

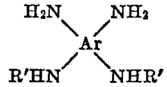

compounds, as well as by diamino compounds such as m- or p-phenylenediamine and the like, or by any polyfunctional reagent which reacts with carbonyl compounds. Particularly, the dialdehyde-terminated polymers are useful for reaction with the diamino-terminated polymers of Example 29.

Equal volumes of the solution of Example 29(a) and of this example are mixed and heated at 90° C. for thirty minutes and films cast and heated at 110° C. for two hours, at 135° C. for two hours, and at 250° C. for six hours. The films are insoluble in DMAC and in concentrated sulfuric acid.

Example 32

The procedure of Example 12 is repeated using 2.56 g. of 4,4'-methylenebis-salicylaldehyde,

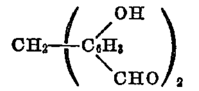

instead of the terephthaldehyde, and there is obtained a polymer solution containing the repeating unit

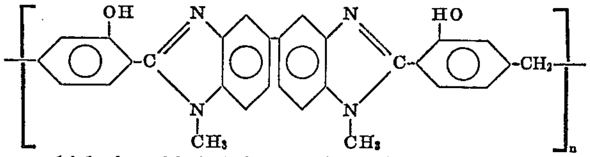

to which is added 0.60 g. of a phenol-formaldehyde (saligenin) resin and films cast at 130° C. for three hours and at 200° C. for twelve hours, yielding a stiff brown film.

Example 33

The procedure of Example 12 is repeated using 3.36 parts of

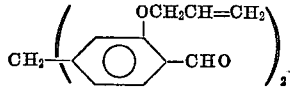

and there is obtained a polymer containing the repeating unit,

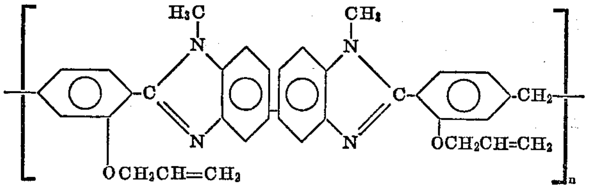

which on heating at 180° C. for six hours yields a crosslinked polymer.

Example 34

The procedure of Example 5 is repeated using instead of the diaminobenzidine an equivalent amount of 1,2,4,5-tetraaminobenzene, or

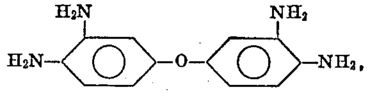

or

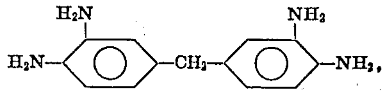

or

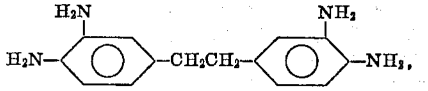

or

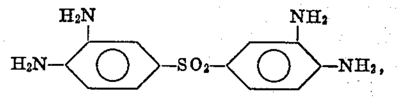

or

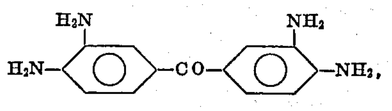

or

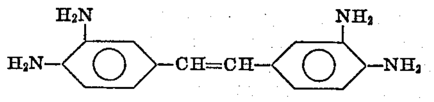

and satisfactory polymers are obtained in each case.

Example 35

The procedure of Example 6 is repeated using instead of the pyromellitic-imidoamino derivative, an equivalent amount of the aminoimide derived from benzophenonetetracarboxylic anhydride,

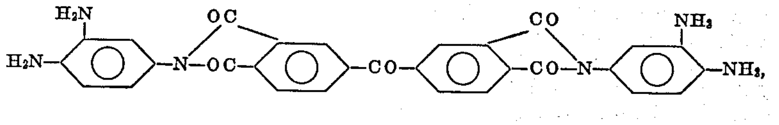

and a polymer, having properties similar to that of Example 6, is obtained.

Example 36

The procedure of Example 30 is repeated using instead of diphenyleneglyoxal, an equivalent weight respectively of m-$C_6H_4(COCHO)_2$, p-$C_6H_4(COCHO)_2$, and p-$CH_2(C_6H_4COCHO)_2$ to yield meta or para

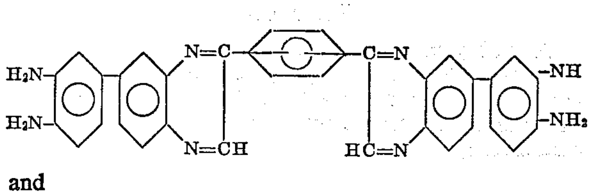

and

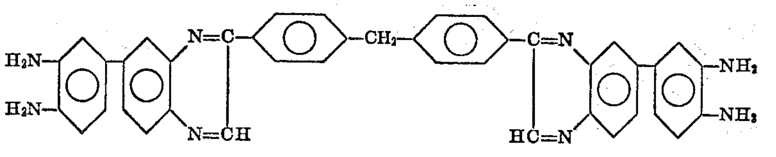

respectively, which are then reacted individually with $m\text{-}C_6H_4(CHO)_2$ by the procedure of Example 30, to give polymers whose properties are similar to that of Example 32.

Example 37

The procedure of Example 7 is repeated using instead of the pyromellitic-diimidedialdehyde an equivalent amount of the dialdehyde-imido compound derived from benzophenonetetracarboxylic anhydride

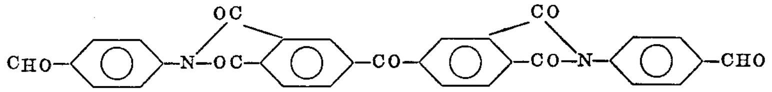

and a polymer having properties similar to that of Example 7 is obtained.

Example 38

The procedure of Example 5 is repeated and instead of using terephthaldehyde, an equivalent amount of $O(C_6H_4CHO)_2$, or $CH_2(C_6H_4CHO)_2$, or

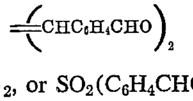

or $(CH_2C_6H_4CHO)_2$, or $SO_2(C_6H_4CHO)_2$, or $CO(C_6H_4CHO)_2$ or $m\text{-}C_6H_4(CONHC_6H_4CHO)_2$, or $p\text{-}C_6H_4(CONHC_6H_4CHO)_2$ and in each case satisfactory polymers are obtained.

What is claimed is:

1. The process of preparing a polymer containing imidazole structures which comprises gradually adding a dialdehyde to a solution of a tetraamine in a solvent inert to the reactants maintained at a temperature of 0° C. to the boiling point of said solvent while oxygen or an oxygen-containing inert gas is passed through the solution, said tetraamine having two pairs of amine groups containing an $—NH_2$ and an —NHR group in each pair in which the $—NH_2$ and —NHR groups are attached directly to an aromatic ring and each —NHR is ortho-disposed to an $—NH_2$ group, in which R is selected from the class of hydrogen or hydrocarbon radicals containing one to twelve carbon atoms, said dialdehyde having the formula $Z(CHO)_2$ and said tetraamine having the formula

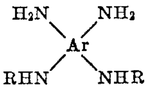

in which formulas Z is a divalent aliphatic, cycloaliphatic or AR'' group having no groups therein, other than the two CHO groups, which are reactive with amine groups, said divalent Ar'' group being similar to the tetravalent Ar group defined below except that two of the said four valencies are occupied by H or R groups; and Ar is a tetravalent aromatic nucleus derived from benzene, toluene, xylene, naphthalene, pyridine, quinoline, quinoxaline or two or three of such nuclei attached directly to each other or by means of on —O—, —S—, —CO—, $—SO_2$, $—CH_2—$, —NH—, —NR—, —CH=CH—, —Si—, —COO— or —CONH— group.

2. The process of claim 1 in which Ar is selected from the class of

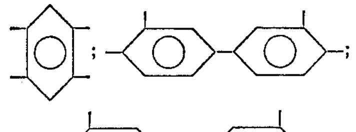

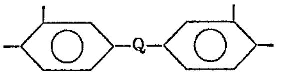

wherein Q represents $—O—$, $—CH_2—$, $—CH_2CH_2—$, $—SO_2—$, $—CO—$, $—HC=CH—$,

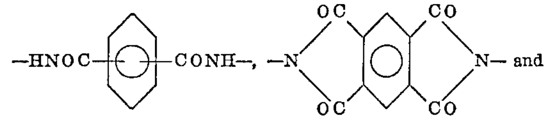

and

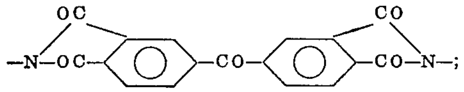

; or

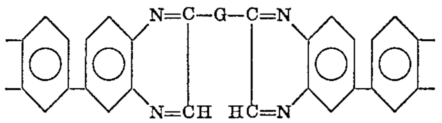

wherein G represents

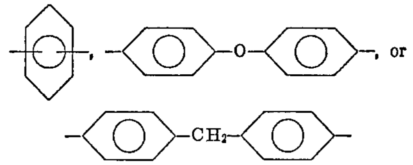

3. The process of claim 2 in which $Z(CHO)_2$ is $OHC—C_6H_4—CHO$, $OHC—C_6H_4—Q—C_6H_4CHO$, wherein Q represents —O—, $—CH_2—$, —CH=CH—, $—CH_2CH_2—$, $—SO_2—$, —CO—, $HNOC—C_6H_4—CONH—$,

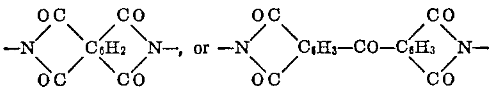

4. The process of claim 3 in which $Z(CHO)_2$ is selected from the class of

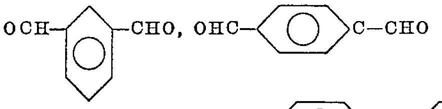

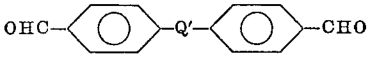

wherein Q' represents $—O—$, $—CH_2—$, $—CH=CH—$, $—CH_2CH_2—$, $—SO_2—$, $—CO—$,

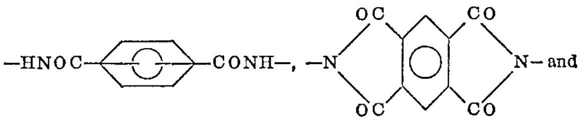

and

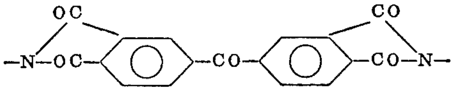

5. The process of claim 1 in which the reaction is performed in the range of 20 to 150° C.

6. The process of claim 5 in which the range is 50 to 120° C.

7. The process of claim 1 in which R in the tetraamine is selected from the class of monovalent aliphatic and olefinic hydrocarbon groups containing one to six carbon atoms.

8. The process of claim 1 in which the $n+1$ moles of the tetraamine are reacted with $n$ moles of the dialdehyde, wherein $n$ has a value of at least one and no more than ten, preparing an amine-terminated condensation product.

9. The process of claim 1 in which $n+1$ moles of dialdehyde are reacted with $n$ moles of the tetraamine, wherein $n$ has a value of at least one and no more than ten, thereby preparing an aldehyde-terminated condensation product.

10. The process of claim 1 in which at least one and no more than 50 mole percent of the tetraamine compound is replaced by an equivalent amount of the diamino compound,

wherein Ar'' is a divalent aromatic moiety corresponding to Ar, in which $NH_2$ and NHR are ortho-disposed to each other.

11. The process of claim 1 in which at least one and no more than 20 mole percent of the tetraamine is replaced by an equivalent amount of

wherein Ar'' is a divalent aromatic moiety corresponding to Ar, and $NH_2$ and SH are ortho-disposed to each other.

12. The process of claim 1 in which at least one and no more than fifty equivalent mole percent of the dialdehyde is replaced by a monoaldehyde containing one to twelve carbon atoms.

13. The process of claim 1 of preparing a quinoxaline-imidazole polymer which comprises first condensing two moles of

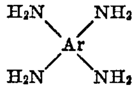

with one mole of $Z(COCOR)_2$ and then with about one mole of $Z(CHO)_2$.

14. The process of claim 1 in which the tetraamino compound is

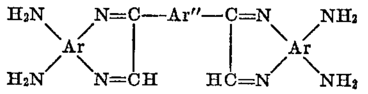

in which Ar'' is a divalent aromatic moiety corresponding to Ar.

15. The process of claim 1 in which the tetraamine compound is

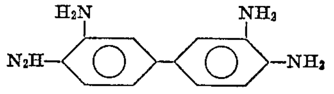

16. A polyimidazole the structure

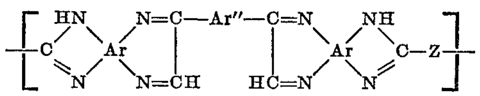

wherein Ar is a tetravalent aromatic moiety, Ar'' is a divalent aromatic moiety, and Z is an aliphatic or aromatic dialdehyde.

17. The process of claim 12 which comprises first reacting

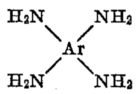

with two moles of a monoaldehyde, R'CHO, to a bis-Schiff product having the formula

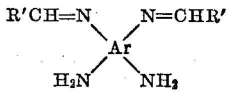

and then reacting the product with $Z(CHO)_2$, in which R' represents a hydrocarbon containing one to twelve carbon atoms.

18. A polymer consisting essentially of repeating units having the structure

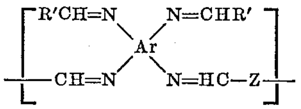

in which R' represents a hydrocarbon containing one to twelve carbon atoms, Ar is a tetravalent aromatic moiety, and Z is an aliphatic or aromatic dialdehyde.

19. The method of claim 1 for preparing a crosslinkable polymer which comprises reacting one mole of

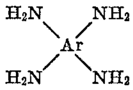

with at least 0.9 and less than 1.5 moles of $Z(CHO)_2$.

20. The process of claim 1 for preparing a flame-retardant polybenzimidazole in which at least five mole percent of $Z(CHO)_2$ is

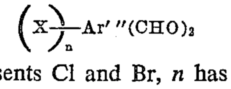

in which X represents Cl and Br, *n* has a value of 1 to 4, and the —CHO groups are meta or para to each other on an aromatic ring, Ar''' is equivalent to the divalent Ar''.

21. The process of claim 1 in which the aldehyde is

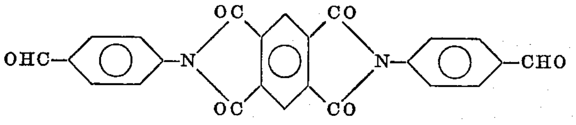

22. A polymer the repeating unit

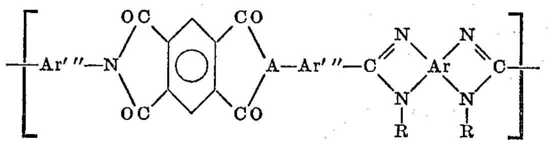

in which Ar''' is a divalent aromatic moiety, Ar is a tetravalent aromatic moiety, and R is selected from the class of hydrogen and hydrocarbon radicals of 1–12 carbon atoms.

23. A polybenzimidazole the repeating unit

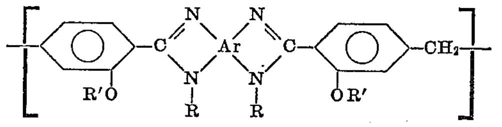

wherein Ar is a tetravalent aromatic moiety, R is hydrogen or R', and R' is a hydrocarbon radical of 1–12 carbon atoms.

24. A polybenzimidazole the repating unit

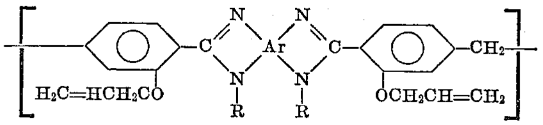

wherein Ar is a tetravalent aromatic moiety, and R is hydrogen or a hydrocarbon radical of 1–12 carbon atoms.

25. A polybenzimidazole the repeating unit

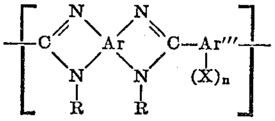

wherein Ar''', X and *n* have the same meaning as in claim 21 wherein Ar is a tetravalent aromatic moiety, Ar''' is a divalent aromatic moiety, X is Cl or Br, and *n* has a value of 1 to 4.

26. A polymer prepared from the polymer of claim 18 by rearrangement of at least some of the repeating units therein to
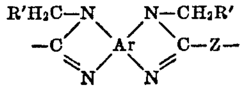
References Cited
UNITED STATES PATENTS
| | | | |
|---|---|---|---|
| Re. 26,065 | 7/1966 | Marvel et al. | 260—47 |
| 3,493,541 | 2/1970 | Gall | 260—72.5 |
| 3,509,097 | 4/1970 | Hoyt et al. | 260—65 |
LESTER L. LEE, Primary Examiner
U.S. Cl. X.R.
117—124 E, 128 U, 138.8 D, 148, 155 R, 161 LN; 260—30.2, 30.6 R, 30.8 R, 30.8 DS, 31.2 N, 32.2, 32.4, 32.6 N, 33.6 R, 52, 64, 65, 51.5

UNITED STATES PATENT OFFICE
CERTIFICATE OF CORRECTION

Patent No. 3,763,107 Dated October 2, 1973

Inventor(s) Gaetano F. D'Alelio

It is certified that error appears in the above-identified patent and that said Letters Patent are hereby corrected as shown below:

Column 37, line 52, correct AR" to read ---Ar"---;
Column 37, line 60, correct "on" to read ---an---;
Column 38, lines 41-43, correct the second formula to read --- OHC-  -CHO ---;

Column 39, line 51, after "polyimidazole"; Column 40, line 34, after "polymer"; and
Column 40, lines 45, 55 and 64, after each appearance of "polybenzimidazole"; insert ---consisting essentially of---;
Column 40, line 55, correct "repating" to read ---repeating---.

Signed and sealed this 1st day of January 1974.

(SEAL)
Attest:

EDWARD M.FLETCHER,JR.
Attesting Officer

RENE D. TEGTMEYER
Acting Commissioner of Patents